United States Patent
Murakami et al.

(10) Patent No.: US 7,181,409 B1
(45) Date of Patent: Feb. 20, 2007

(54) SHARED VEHICLE SYSTEM AND METHOD INVOLVING RESERVING VEHICLES WITH HIGHEST STATES OF CHARGE

(75) Inventors: Hiroshi Murakami, Wako (JP); Shunji Yano, Wako (JP); Kazuhiro Nakamura, Wako (JP); Matthew James Barth, Riverside, CA (US); Michael Donovan Todd, Redlands, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/349,423

(22) Filed: Jul. 7, 1999

(51) Int. Cl.
  *G06F 17/60* (2006.01)

(52) U.S. Cl. .......................................... 705/5

(58) Field of Classification Search ...................... 705/5
  See application file for complete search history.

(56) References Cited

U.S. PATENT DOCUMENTS

| | | | |
|---|---|---|---|
| 1,223,258 | A | 4/1917 | Cooper |
| 3,624,608 | A | 11/1971 | Altman et al. |
| 3,665,397 | A | 5/1972 | Di Napoli et al. |
| 3,742,453 | A | 6/1973 | Polylo |
| 3,754,122 | A | 8/1973 | Di Napoli et al. |
| 3,757,290 | A | 9/1973 | Ross |
| 3,858,775 | A | 1/1975 | Haas |

(Continued)

FOREIGN PATENT DOCUMENTS

CA  2 227 664  7/1998

(Continued)

OTHER PUBLICATIONS

Barth Matthew, Aug. 1999, Simulation model perfromance analysis of a multiple station shared vehicle system, Transportation Research. Part C, Emerging Technologies, vol. 7, issue 4, p. 237-59.*

(Continued)

*Primary Examiner*—Joseph Thomas
*Assistant Examiner*—Robert W. Morgan
(74) *Attorney, Agent, or Firm*—Fish & Richardson P.C.

(57) ABSTRACT

A shared vehicle system includes a central facility, at least one vehicle distribution port facility and a plurality or fleet of vehicles, each having a vehicle subsystem. In general, the central station and port facility and the vehicle subsystems communicate in a manner to allow a user to enter information at a port facility. That information is then communicated to the central facility, where the information is processed to select a vehicle from the fleet to allocate to the user at the port facility. Selection of a vehicle for allocation to a user may be based on selecting an available or soon to be available vehicle according to various algorithms that take into account the vehicles state of charge. The central station also communicates with the port facility and the vehicle subsystem to notify the user of the selected vehicle, to provide secure user access to the selected vehicle, to monitor the location and operating status of vehicles in the fleet, to monitor the state of charge of electric vehicles and to provide other functions. The vehicles communicate with the central station to notify the central station of the PIN number of the individual attempting to use the vehicle, and of vehicle parameters such as state of charge and location of the vehicle.

35 Claims, 12 Drawing Sheets

U.S. PATENT DOCUMENTS

| | | | |
|---|---|---|---|
| 3,906,447 | A | 9/1975 | Crafton |
| 3,997,044 | A | 12/1976 | Schasser |
| 4,072,859 | A | 2/1978 | McWaters |
| 4,353,055 | A | 10/1982 | Kawakatsu et al. |
| 4,360,875 | A | 11/1982 | Behnke |
| 4,392,133 | A | 7/1983 | Lundgren |
| 4,438,426 | A | 3/1984 | Adkins |
| 4,495,484 | A | 1/1985 | Kawakatsu et al. |
| 4,620,429 | A | 11/1986 | Quillen |
| 4,692,762 | A | 9/1987 | Lewiner et al. |
| 4,719,460 | A | 1/1988 | Takeuchi et al. |
| 4,776,003 | A | 10/1988 | Harris |
| 4,777,646 | A | 10/1988 | Harris |
| 4,994,714 | A | 2/1991 | Hoekman et al. |
| 5,066,034 | A | 11/1991 | Carr |
| 5,066,853 | A | 11/1991 | Brisson |
| 5,168,451 | A | 12/1992 | Bolger |
| 5,206,643 | A | 4/1993 | Eckelt |
| 5,265,006 | A | 11/1993 | Asthana et al. |
| 5,289,369 | A | 2/1994 | Hirshberg .................. 364/401 |
| 5,337,046 | A | 8/1994 | Grasset |
| 5,357,143 | A | 10/1994 | Lehr et al. |
| 5,366,338 | A | 11/1994 | Mortensen |
| 5,493,694 | A | 2/1996 | Vlcek et al. |
| 5,539,399 | A | 7/1996 | Takahira et al. |
| 5,557,254 | A | 9/1996 | Johnson et al. |
| D374,208 | S | 10/1996 | Eva, Jr. |
| 5,579,973 | A | 12/1996 | Taft |
| 5,604,676 | A | 2/1997 | Penzias |
| 5,612,608 | A | 3/1997 | Ishiguro et al. |
| 5,614,804 | A | 3/1997 | Kayano et al. |
| 5,648,768 | A | 7/1997 | Bouve |
| 5,664,113 | A | 9/1997 | Worger et al. |
| 5,686,895 | A | 11/1997 | Nakai et al. |
| 5,717,387 | A | 2/1998 | Suman et al. |
| 5,721,550 | A | 2/1998 | Lopez |
| 5,726,885 | A * | 3/1998 | Klein et al. ........... 364/423.098 |
| 5,737,710 | A | 4/1998 | Anthonyson |
| 5,751,973 | A | 5/1998 | Hassett |
| 5,787,583 | A | 8/1998 | Wolf et al. |
| 5,790,976 | A | 8/1998 | Boll et al. |
| 5,803,215 | A | 9/1998 | Henze et al. |
| 5,812,070 | A * | 9/1998 | Tagami et al. ........... 340/932.2 |
| 5,838,251 | A | 11/1998 | Brinkmeyer et al. |
| 5,869,950 | A * | 2/1999 | Hoffman, Jr. et al. ...... 320/103 |
| 5,878,368 | A | 3/1999 | DeGraaf |
| 5,908,453 | A | 6/1999 | Tabata et al. |
| 5,922,040 | A | 7/1999 | Prabhakaran |
| 5,945,919 | A | 8/1999 | Trask |
| 5,948,040 | A | 9/1999 | DeLorme et al. |
| 5,987,377 | A | 11/1999 | Westerlage et al. |
| 5,995,013 | A | 11/1999 | Yoshizawa et al. |
| 5,995,898 | A | 11/1999 | Tuttle |
| 6,065,798 | A | 5/2000 | Sankrithi |
| 6,078,850 | A | 6/2000 | Kane et al. |
| 6,088,636 | A | 7/2000 | Chigumira et al. |
| 6,089,431 | A | 7/2000 | Heyworth |
| 6,129,371 | A | 10/2000 | Powell |
| 6,133,707 | A | 10/2000 | Kikuchi et al. |
| 6,154,006 | A | 11/2000 | Hatanaka et al. |
| 6,157,315 | A * | 12/2000 | Kokubo et al. ........ 340/825.33 |
| 6,181,991 | B1 | 1/2001 | Kondo et al. |
| 6,185,487 | B1 | 2/2001 | Kondo et al. |
| 6,185,501 | B1 | 2/2001 | Smith et al. |
| 6,225,890 | B1 | 5/2001 | Murphy |
| 6,240,365 | B1 | 5/2001 | Bunn |
| 6,249,233 | B1 | 6/2001 | Rosenberg et al. |
| 6,253,129 | B1 | 6/2001 | Jenkins et al. |
| 6,253,980 | B1 | 7/2001 | Murakami et al. |
| 6,278,936 | B1 | 8/2001 | Jones |
| 6,304,223 | B1 | 10/2001 | Hilton et al. |
| 6,317,720 | B1 | 11/2001 | Murakami et al. |
| 6,336,295 | B1 | 1/2002 | Takei et al. |
| 6,340,935 | B1 | 1/2002 | Hall |
| 6,356,836 | B1 | 3/2002 | Adolph |
| 6,427,913 | B1 | 8/2002 | Maloney et al. |
| 2001/0037174 | A1 | 11/2001 | Dickerson |
| 2003/0014302 | A1 | 1/2003 | Jablin |

FOREIGN PATENT DOCUMENTS

| | | |
|---|---|---|
| DE | 22 10 088 | 10/1972 |
| DE | 40 24 186 A1 | 2/1992 |
| DE | 4024186 | 2/1992 |
| DE | 40 32 198 A1 | 4/1992 |
| DE | 42 27 969 A1 | 3/1994 |
| DE | 4227969 | 3/1994 |
| DE | 43 01 039 A1 | 7/1994 |
| DE | 4301039 | 7/1994 |
| DE | 44 29 852 A1 | 2/1996 |
| DE | 195 08 369 C1 | 3/1996 |
| DE | 195 08 370 A1 | 9/1996 |
| DE | 195 21 902 A1 | 12/1996 |
| DE | 38 05 810 A1 | 9/1998 |
| DE | 42 27 969 A1 | 9/1998 |
| DE | 197 28 885 A1 | 1/1999 |
| DE | 298 11 292 U1 | 1/1999 |
| DE | 197 40 602 A1 | 3/1999 |
| DE | 100 33 341 A1 | 1/2002 |
| EP | 0 147 284 B1 | 7/1985 |
| EP | 0 212 842 A1 | 3/1987 |
| EP | 0 307 485 B1 | 3/1989 |
| EP | 0 323 326 B1 | 7/1989 |
| EP | 0 433 740 B1 | 6/1991 |
| EP | 0 451 482 A1 | 10/1991 |
| EP | 0 509 776 | 10/1992 |
| EP | 0 309 318 B1 | 12/1992 |
| EP | 0 653 732 A1 | 5/1995 |
| EP | 0 694 885 A2 | 1/1996 |
| EP | 0 179 160 A1 | 4/1996 |
| EP | 0 708 427 A2 | 4/1996 |
| EP | 0704352 A1 | 4/1996 |
| EP | 0765984 A2 | 4/1997 |
| EP | 0 877 341 A2 | 11/1998 |
| EP | 877341 A2 * | 11/1998 |
| EP | 0 991 031 A2 | 4/2000 |
| EP | 0 997 861 A2 | 5/2000 |
| EP | 1 011 085 A2 | 6/2000 |
| EP | 1 067 480 A2 | 1/2001 |
| EP | 1 067 498 A1 | 1/2001 |
| EP | 1 087 481 A2 | 1/2001 |
| EP | 1172768 | 1/2002 |
| FR | 2 232 064 | 12/1974 |
| FR | 2 212 064 | 7/1979 |
| FR | 2 535 491 | 5/1984 |
| FR | 2 625 954 | 7/1989 |
| FR | 2625954 | 7/1989 |
| FR | 2 656 450 | 6/1991 |
| FR | 2656450 | 6/1991 |
| FR | 2 662 285 | 11/1991 |
| FR | 2 612 319 | 5/1992 |
| FR | 2 692 064 | 12/1993 |
| FR | 2692064 | 12/1993 |
| FR | 2 712 715 | 5/1995 |
| FR | 2712715 | 5/1995 |
| FR | 2 732 144 | 9/1996 |
| FR | 2732144 | 9/1996 |
| FR | 2 126 602 | 6/1997 |
| GB | 2 146 154 A | 4/1985 |
| GB | 2 271 081 A | 10/1989 |
| GB | 2 291 235 A | 2/1996 |
| JP | 11-127750 | 3/1973 |
| JP | 04-133195 | 5/1992 |
| JP | 05-133195 | 5/1993 |

| | | |
|---|---|---|
| JP | 08-138199 | 5/1996 |
| JP | 10-208195 | 8/1998 |
| JP | 10-254978 | 9/1998 |
| JP | 10-255162 | 9/1998 |
| JP | 10-255191 | 9/1998 |
| JP | 10-261199 | 9/1998 |
| JP | 10-286191 | 9/1998 |
| JP | 10-326400 | 12/1998 |
| JP | 11-127788 | 5/1999 |
| JP | 11-201752 | 7/1999 |
| JP | 2001067581 A | 3/2001 |
| JP | 2001-67581 | 3/2003 |
| WO | WO 84/03785 | 9/1984 |
| WO | WO 85/01812 | 4/1985 |
| WO | WO 92/22043 | 12/1992 |
| WO | WO 95/21435 | 8/1995 |
| WO | WO 99/44186 | 9/1999 |

OTHER PUBLICATIONS

Bill Donahue; May 17, 2000, Cars You Drive for Just a Little While, Then It's Their Turn, New York Times, Late Edition(East Coast), H.10.*
Environmental Information Network, Inc., Aug. 31, 1995, "Station Car EV Could Meet State Mandates"; Electric Vehicle Energy Network Online Today.*
Nancy Brooks, Electric Vehicle Rental Agency Makes Debut In L.A., Dec. 11, 1998, The Scramento Bee, p. C.11.*
"Hydralift—The Art of Lifting", Hydralift USA, HLRF0721.
U.S. Appl. No. 09/348,515, filed Jul. 7, 1999, Murakami et al.
U.S. Appl. No. 09/348,518, filed Jul. 7, 1999, Murakami et al.
U.S. Appl. No. 09/348,803, filed Jul. 7, 1999, Murakami et al.
U.S. Appl. No. 09/607,525, filed Jun. 28, 2000, Murakami et al.
U.S. Appl. No. 09/349,425, filed Jul. 7, 1999, Murakami et al.
Desimone, et al., "Case studies in Fleet Operation Modelling: An application of AI scheduling techniques", Proceedings of the Winter Simulation Conference 1990, pp. 290-299, ACM 1990.
Bailey, et al., "A Simulation Analysis of Demand and Fleet Size Effects on Taxicab Service Rates", Proceedings of the Winter Simulation Conference, 1987, pp. 838-844, ACM 1987.
Cathy Lang Ho, "Pooled Cars", *Architecture*, vol. 89, Issue 10, p. 76 (3 pages); Oct., 2000.
McDonald, "Car-sharing could be answer to traffic chaos One measure which would help alleviate Dublin's traffic problems seems almost too good to be true" *Irish Times*, p. 9, Sep. 1, 1999.
Yano, "Implementing ICVS Regional Shared Transportation System in Singapore", *IEEE 5th International Conference on Intelligent Transportation Systems*, pp. 423-427, Singapore, Sep. 3-6, 2002.
Barth, et al., "Performance Evaluation of a Multi-Station Shared Vehicle System", *IEEE Intelligent Transportation Systems Conference Proceedings*, pp. 1218-1223, Oakland, California, Aug. 25-29, 2001.
Barth, et al., "A hybrid communication architecture for intelligent shared vehicle systems", *Intelligent Vehicle Symposium*, vol. 2, pp. 557-563, Jun. 17-21, 2002.
European Patent Office Search Report of 01305580.1-2215, Nov. 7, 2001, 2 pages.
European Patent Office Search Report of 99225392, Feb. 9, 2001, 3 pages.
European Patent Office Search Report of 00305739, Oct. 20, 2000, 2 pages.
European Patent Office Search Report of 95304203, Mar. 8, 1996, 1 page.
European Patent Office Search Report of 94402568, Dec. 12, 1994, 1 page.
European Patent Office Search Report of 91102927, Jun. 13, 1991, 1 page.
European Patent Office Search Report of 86305442, Oct. 30, 1986, 3 pages.
Australian Patent Office Search Report of SG 20003722-6, Jan. 24, 2002, 4 pages.
Australian Patent Office Search Report of SG 20003721-8, Jan. 24, 2002, 2 pages.
Australian Patent Office Search Report of SG 200103958-5, Nov. 19, 2002, 2 pages.
United Kingdom Patent Office Search Report of GB9413527.4, Sep. 1994, 1 page.
French Report Office Search Report of 0005779, Feb. 1, 2002, 2 pages.
French Patent Office Search of FR 0004270, Jun. 29, 2001, 1 page.
French Patent Office Search Report of FR 9503408, Dec. 29, 1995, 1 page.
French Patent Office Search Report of FR 94402568, Dec. 12, 1994, 1 page.
Praxitele web site=http://www-rocq.inria.fr/praxitele/welcome-angl.html?59, Dec. 31, 1997.
Bill Donahue, May 17, 2002, Cars You Drive for Just a Little While, Then It's Their Turn, New York Times, Coast), p. 10.
Matthew Barth; Aug. 1999, Stimulation Model Performance Analysis of a Multiple Station Shared Vehicle System, Transportation Research, Issue 7C, vol. 4, Pages.

* cited by examiner

VEHICLE ACCESS FLOW CHART

VEHICLE TRIP FLOW CHART

PORT FACILITY

CENTRAL FACILITY

VEHICLE SUBSYSTEM

SHARED VEHICLE SYSTEM AND METHOD INVOLVING RESERVING VEHICLES WITH HIGHEST STATES OF CHARGE

BACKGROUND OF THE INVENTION

1. Field of the Invention

The present invention relates, generally, to systems and methods for sharing a fleet of vehicles among a plurality of users and, in preferred embodiments, to such systems and methods for sharing a fleet of electric vehicles, including systems and methods relating to allocating, tracking, securing, managing and relocating of shared vehicles and, in yet further preferred embodiments, to systems and methods relating to allocating, tracking, securing, managing, relocating and charging of shared electric vehicles.

2. Description of the Related Art

In most modern, industrial countries, private automobiles play an important and sometimes indispensable role as a means for transporting people within and beyond local areas, for example, to and from places of work, study or worship, on errand trips or in commercial activities, such as deliveries, sales visits, repair visits or the like. As a result of these important roles, the number of automobiles in and around most industrialized cities and neighboring regions continues to grow. The increasing numbers of automobiles results in higher occurrences of traffic jams and higher demands for parking spaces.

Mass transit systems, such as busses, commuter trains, subways, streetcars or the like can fulfill some of the transportation needs of those communities and municipalities that have such systems. However, travel with such systems is confined to pre-set stop locations and times, set by the route and time schedule of the bus, train, subway or streetcar. The prescribed routes and time schedules typically do not meet many travelers' needs or are too inconvenient for practical usage of the mass transportation system by some travelers. For many mass transportation users, the pre-set stop location is far enough from their origination or destination locations that they must find additional modes of transportation to or from the pre-set stop. For example, some users drive private vehicles to and from pre-set stop locations and park the vehicles near the stop locations. Some mass transportation systems even provide vehicle parking facilities near pre-set stop locations for such users.

For example, commuter train stops and bus stops in and near some cites are often provided with parking lots for train users to park private vehicles. However, vehicles in such parking lots typically remain parked throughout a large part of the day, and are driven only in the morning to bring the user to the train or bus stop and in the evening to take from the train or bus stop. Thus, while modern mass transportation systems can result in a reduced number of vehicles on the road at any given time, such mass transportation systems do not eliminate the need for private vehicles and can result in an inefficient use of private vehicles.

Accordingly, there is a need for a system and method for the efficient and convenient use of private vehicles, such as an efficient and convenient shared vehicle system and method. Shared vehicle systems can provide more flexibility than other means of public transportation. In a shared vehicle system, a number of vehicles are normally maintained in several designated parking areas. Each user is allowed to pick up a vehicle at one parking area, and return the vehicle to the parking area nearest to the user's destination. The user may also drive a vehicle out of a designated parking area for an errand and return the vehicle to the same designated parking area. Shared vehicle systems that are used by a relatively large number of subscribers should include sufficient security measures to protect the vehicles from theft and also to protect the user from crime.

Shared vehicle systems must be sufficiently convenient to motivate users to employ the system. Accordingly, vehicle availability within a reasonable time of a user's request for a vehicle is very important to the success of such a system. Of course, by maintaining a greater number of vehicles in the fleet of shared vehicles, the availability of a vehicle at any given time can be increased. However, system cost is minimized and vehicle-usage efficiency is maximized with smaller vehicle fleets. Accordingly, there is a need for a shared vehicle system that maximizes user convenience yet minimizes the number of vehicles required in the fleet.

In particular, by employing vehicles in a shared vehicle system or method, additional ecological advantages can be achieved. Vehicles in a shared system may be of many types. They may be the conventional petroleum based gasoline or diesel fuel type vehicles. They may however be cleaner forms of propulsion such as methanol or propane powered vehicles, or may be vehicles powered by hydrogen stored as a gas or metal hydride. Electric vehicles may draw energy from batteries, fuel cells, generators driven by internal combustion engines, or combinations of different energy sources. Electric vehicles powered by both lead acid and nickel metal hydride batteries have shown much promise and several manufacturers have produced viable electric vehicles employing these battery technologies. Electric vehicles are a good candidate for a shared vehicle, because they are among the cleanest and quietest forms of vehicle, but sharing systems and methods are in no way dependent on the use of an electric vehicle, and may be employed with a number of non electrical or hybrid technologies, including common gasoline power.

The use of electric powered vehicles in a fleet of shared vehicles, however, presents further complexities over other alternate power vehicles, for example, associated with vehicle charging requirements and vehicle unavailability during charging times.

Electric vehicles typically require charging more often than the conventional vehicles require refueling. Recharging stations are not nearly as available as conventional petroleum motor fuels. Moreover, recharging of an electric vehicle typically takes much more time than refueling a conventional vehicle. Thus, if a conventional vehicle is present at a designated parking area of a shared vehicle system, but does not have sufficient fuel to meet a user's travel needs, the vehicle can be quickly refueled and made available to the user. However, even when an electric vehicle is idle in a designated parking space, it is not available to a user unless it has a sufficient existing state of charge (SOC) to make the user's intended trip. Typically, an electric vehicle cannot be re-charged quickly enough to make the intended trip if its existing SOC is inadequate. On the other hand, if the user intends to make a short trip, the vehicle may be capable of making the intended trip even though it is not fully charged. Accordingly, there is a further need for a system and method for managing shared electric vehicles in an optimum fashion and to meet the needs of a maximum number of users with a minimum number of vehicles.

SUMMARY OF THE DISCLOSURE

Therefore, preferred embodiments of the present invention relate to shared vehicle systems and methods that maximize user convenience and minimize the number of vehicles required in the shared fleet.

A shared vehicle system according to one preferred embodiment of the present invention includes a central facility, at least one vehicle distribution port facility and a plurality or fleet of vehicles, each having a vehicle subsystem. In general, the central station and port facility and the vehicle subsystems communicate in a manner to allow a user to enter information at a port facility. That information is then communicated to the central facility, where the information is processed to select a vehicle from the fleet for allocation to the user at the port facility. The central station communicates with the port facility and the vehicle subsystem, according to various embodiments described below, to notify the user of the selected vehicle, to provide secure user access to the selected vehicle, to monitor the location and operating status of vehicles in the fleet, to monitor the state of charge of electric vehicles and to provide other functions described below.

According to one aspect of the invention, allocation of shared vehicles to users is based, at least in part, on travel information received from the users. By allocating vehicles based on travel information the efficient usage of vehicles and user convenience can be optimized, for example, to maximize vehicle availability and minimize vehicle downtime. While various embodiments related to this aspect of the invention may employ any form of shared vehicle, according to further embodiments of the present invention, vehicle sharing systems and methods employing electric vehicles in the shared fleet and the allocation of electric vehicles to users is managed to maximize vehicle availability and minimize vehicle downtime, taking into account the state of charge of a vehicle and/or the charging rate of a vehicle.

According to another aspect of the invention, a shared vehicle system or method provides controlled or secured access to and/or enablement of the shared vehicles. In preferred embodiments, user identification information is provided to a vehicle that has been allocated to a user and such information must match information entered by the user in a user interface device installed on the vehicle, before the user is allowed access to the vehicle. In yet further preferred embodiments, a user's personal identification number PIN must be entered by the user in a second interface device installed on the vehicle and must match an expected PIN, before the vehicle is enabled for operation.

According to yet another aspect of the invention, a shared vehicle system and method involves allocating vehicles from a group of available vehicles and returning vehicles to the group upon detection of a parking state while the vehicle is located at a port. A port is a vehicle staging area where vehicles may be parked prior to being allocated to a user. A typical port contains a user kiosk containing a computer terminal for interacting with the shared vehicle system. Throughout this disclosure the term "kiosk" will be used to mean a kiosk with a user terminal. The terms kiosk and terminal shall be used interchangeably herein. In preferred embodiments, the detection of a parking state is accomplished by, for example, the detection of the setting of the vehicle in a parking gear, the lack of motion of a vehicle for a period of time, the opening and/or closing of a vehicle door, or a combination of such events, each of which require no user interaction other than the typical actions taken to park a vehicle.

According to yet another aspect of the invention, a shared vehicle system and method involves protecting access and enabling vehicles from a remote location relative to the vehicles, for example, in the event that a user loses an identification code or PIN.

According to yet another aspect of the invention, a shared vehicle system and method involves tracking stored energy and/or other operational parameters of vehicles in the shared fleet. In preferred embodiments, vehicle parameters, such as stored energy, are tracked and processed for purposes of efficient selection and allocation of vehicles to users or selection of vehicles for charging.

According to yet another aspect of the invention is that, if electrical vehicles are employed within a shared vehicle system, the electrical vehicles are allocated to users based on the state of charge (SOC) of the vehicles, in addition to vehicle location, user travel information and statistical analysis of vehicle usage. According to a further advantage of preferred embodiments, vehicles are allocated from a defined vehicle search group (VSG) of a port facility. A vehicle search group is defined as the set of vehicles that may be allocated to a user. A vehicle search group is determined by deciding what time period is acceptable as a vehicle search depth time, that is how long a predefined wait is acceptable before a vehicle becomes available. The vehicle search group then is ascertained by determining which vehicles will be available at the end of the predefined waiting period. Vehicles within the vehicle search group of a port facility include vehicles that are due to arrive at the port facility within the predefined period of time or electric vehicles that are due to become sufficiently charged at the port facility within a predefined period of time, minus the vehicles within the port that have been allocated for departing trips or are scheduled for transport to another port facility.

In one preferred embodiment that includes electrical vehicles within the shared vehicle group, a user is allocated a vehicle having the highest SOC within a vehicle search group of vehicles having sufficient SOC to meet a user's needs. The present method for determining SOC is disclosed in U.S. Pat. No. 5,614,804, which is incorporated by reference herein. Apparatus for displaying SOC is disclosed in U.S. Pat. Nos. 5,686,895 and 5,612,608, both of which are incorporated by reference herein. In another preferred embodiment, a user is allocated a vehicle having the second highest (or Nth highest) SOC within a vehicle search group of vehicles having sufficient SOC to meet the user's needs, such that the highest (or N–1 highest) SOC vehicles may be reserved for users having travel needs which requiring a higher SOCs. In yet another preferred embodiment, the system or method has the ability to allocate the highest or Nth highest SOC vehicle, depending upon other criteria, such as the time of day or day of the week. Thus, for a certain time period of the day and/or day of the week (for example, between 7:00 a.m. and 9:00 a.m. on Monday through Friday) the system or method may allocate the highest SOC vehicle in the vehicle search group is allocated to a user, while at other times of the day and/or days of the week, the Nth highest SOC vehicle is allocated to a user.

According to a further aspect of the present invention, a shared vehicle system and method involves transporting or relocating vehicles from one area or port having a surplus of vehicles to another area or port having a shortage of vehicles. Vehicles may also be transported to effectively use storage space for the parking of the vehicles. According to yet a further aspect of the present invention, a shared vehicle system and method involves a vehicle carrier for carrying a first vehicle with a second vehicle, for example, for relocating the first and/or second vehicle.

The above and other aspects, features, and advantages of the present invention, will become apparent from the following description when taken in conjunction with the accompanying drawings in which preferred embodiments of the present invention are shown by way of illustrative example.

BRIEF DESCRIPTION OF THE DRAWINGS

Referring now to the drawings in which like reference numbers represent corresponding parts throughout.

DESCRIPTION OF THE REFERRED EMBODIMENT

In the following description of preferred embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the preferred embodiments of the present invention.

The present invention relates, generally, to systems and methods for sharing a fleet of vehicles among a plurality of users, and various aspects of such systems and methods including optimizing vehicle allocation, vehicle tracking, security, and charging and managing of shared electric vehicles. As discussed above, in a shared vehicle system, a number of vehicles are normally maintained in several designated parking areas. Each user is allowed to pick up a vehicle at one parking area, and return the vehicle to the parking area nearest to the user's destination or return the vehicle to the same designated parking area.

To successfully attract people to subscribe and become users of a shared vehicle system, the system must be sufficiently convenient and inexpensive. More particularly, users should be able to pick up a vehicle at a convenient location and with minimal or no waiting time. The system should be easy and inexpensive for the user and cost effective for the system administrator to operate. To have minimal environmental impact, the system should be capable of addressing the above needs and employing clean means of transportation, such as electric powered vehicles, as its primary shared vehicle.

Preferred embodiments of the present invention relate to shared vehicle systems and methods which address the above-described needs and which address additional needs and provide additional advantages discussed below. As will become apparent from the discussion below some embodiments pertain only to sharing systems containing at least some electrical vehicles. Those embodiments of the invention relate to charging or state of charge (SOC) of electric vehicles and may be implemented with or without various other aspects relating to, for example, vehicle allocation, tracking, and securing. Similarly, embodiments of the invention relating to vehicle allocation aspects may be implemented with or without various other aspects such as vehicle charging, tracking and securing, and embodiments relating to vehicle securing may be implemented with or without other aspects such as vehicle tracking, allocation or charging.

Figure 1:
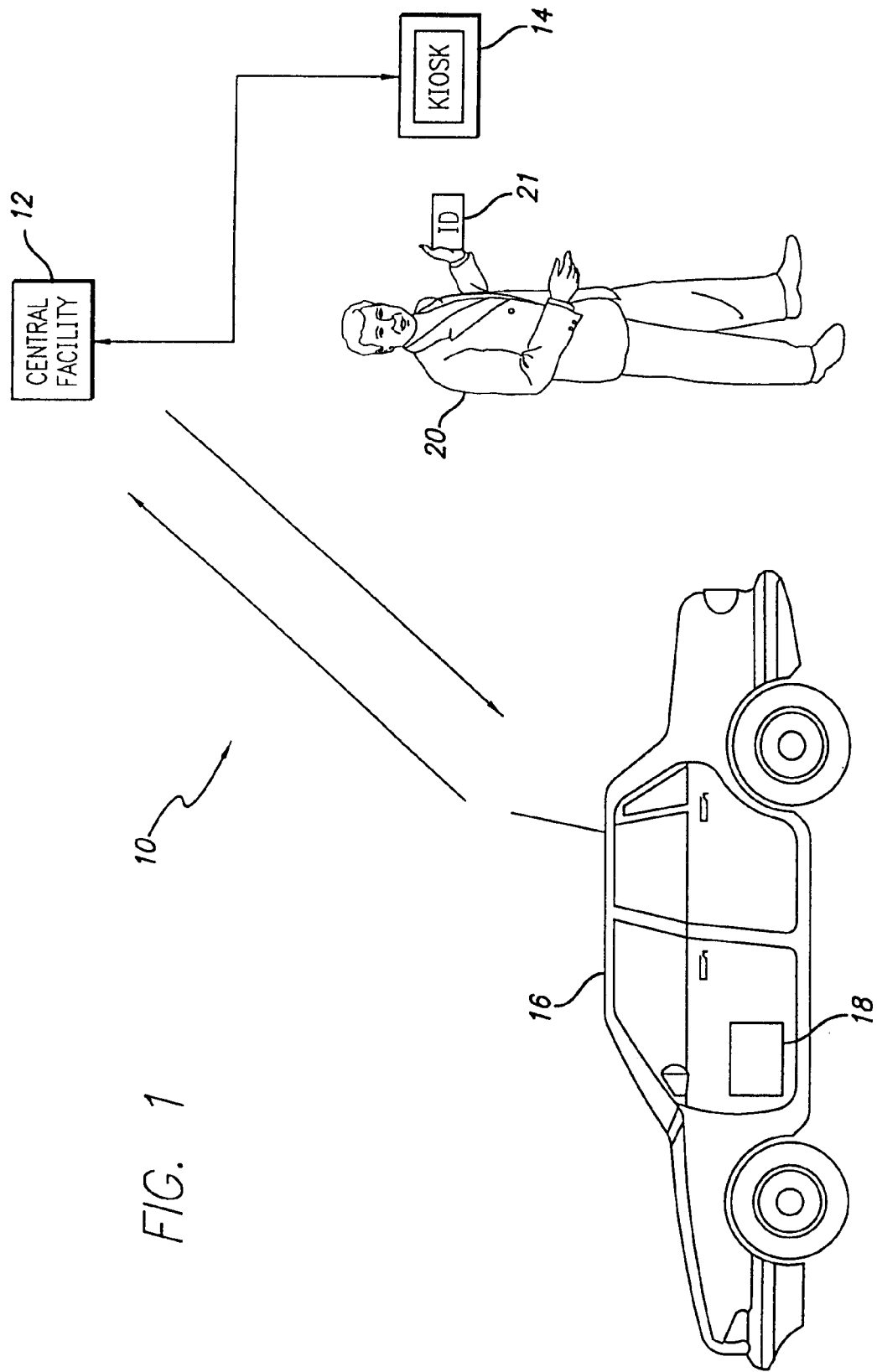
FIG. 1 is a schematic diagram representation of a vehicle sharing system according to a preferred embodiment of the present invention.

A schematic representation of a shared vehicle system 10 according to a preferred embodiment of the present invention is shown in FIG. 1. A system 10 according to the FIG. 1 embodiment includes a central facility 12, at least one vehicle distribution port facility 14 and a plurality or fleet of vehicles 16 (one of which is shown in FIG. 1), each having a vehicle subsystem 18. In general, the central station and port facility and the vehicle subsystems communicate in a manner to allow a user 20 to enter information at a port facility 14. That information is then communicated to the central facility 12, where the information is processed to select a vehicle from the fleet to allocate to the user at the port facility 14. The central station 12 communicates with the port facility 14 and the vehicle subsystem 18, according to various embodiments described below, to notify the user of the selected vehicle, to provide secure user access to the selected vehicle, to monitor the location and operating status of vehicles in the fleet, to monitor the state of charge of electric vehicles and to provide other functions described below.

Selection and Allocation off Sharing Systems Containing Electric Vehicles:

According to one aspect of the present invention, systems and methods for sharing electric vehicles involve selecting and allocating vehicles to users, based on a combination of factors for maximizing efficiency and user-convenience. Such factors may include various combinations of the following: the location of the vehicles within the fleet, state of charge of the vehicles, the distance which the user expects to travel, the period of time that the user expects to use the vehicle, the user's expected destination, statistical analysis of vehicle use patterns and the identity of the user, the number of individuals waiting for vehicles in the port, and the number of vehicles present in the port.

A user desiring to obtain the use of a vehicle 16 arrives at a first port facility 14 and enters a request for a vehicle and other information into a computer system. The information may include the destination port or kiosk. The information may also include the additional distance and/or time that the user expects to travel beyond the normal distance and/or time to reach the destination port facility, for example, to conduct errands or other excursions. The information may further include user identification information, for example, read from a card key 21, smart card, magnetic strip, fingerprint, retinal scan or other machine-readable method of identification.

In a preferred embodiment, described with reference to the system in FIG. 1 and the flow chart of FIG. 2, a user enters identification information by swiping a card key 21 (or other machine-readable token) past a reader, step 22. The information is received by the system in step 24 and, in step 26, the user enters travel information (such as destination, added distance and/or added time) with a keyboard, touchscreen, mouse or other suitable user interface. In step 27 the availability of a vehicle is checked, and if a vehicle is available step 28 follows, if not step 40 will be next.

In the present preferred embodiment, the computer system at the port facility 14 is programmed to prompt the user to enter the above-noted travel information, upon the user registering by swiping the card key 21 (or other token) past the reader. The computer system may display destination options and/or additional time or distance options. Thus, the display may prompt the user to, for example, select or click an icon for a proposed destination port facility. In addition other icons for selecting a proposed additional number of minutes or miles of expected travel beyond the route to the destination port may be displayed. By selecting the additional icons the user may inform the system that the user will have an errand trip. An errand trip is a detour from the regular route that would be taken in traveling between points. For example a user of a vehicle may travel directly to a destination or they may take a side excursion for example to pay a bill or to buy a newspaper. Such side excursions are errand trips. The user can select different icons notifying the system that, for instance an errand trip will take an additional 45 minutes and add an additional 10 miles beyond what would be expected if the direct route to the destination were taken without the errand trip. In yet further embodiments, a map is displayed to the user and the user is prompted to identify locations on the map corresponding to a destination and/or side trip locations or zones. It can be very important to the scheduling and allocation of vehicles to allow for excursions such as errand trips. Efficient allocation of vehicles is easier if vehicle trips can be predicted with greater reliability and accuracy. Embodiments of the vehicle sharing system and method include implementations which reward users for accuracy, for example if the user returns the vehicle within 5 minutes of the planned return time the user may get an "accurate return time" discount. Users may also get a discount if they give notice of unexpected delays. For example if the users were charged a per hour rate a user would be charged for a whole hour if they returned a vehicle 10 minutes late, whereas if they gave notice of their late return, so that the vehicle could be reallocated during the proper time frame, they might be charged for only a portion of an hour. Similar discounts might be given for accurately predicting the number of miles driven. By accurately predicting the distance to be driven the system could more accurately predict, at the beginning of a trip, the state of charge (for electrical vehicles) that will be present when a vehicle is returned, thus enabling more efficient allocation of vehicles and charge facilities.

The information entered by the user at a port facility 14 is communicated to the central facility 12. In addition, the central facility 12 receives information transmitted from the vehicle subsystem 18 in each vehicle 16, relating to the location, parking state, odometer information, state of charge SOC of the vehicle, trip time, and various other trip information and statistics. Based on the information received from the first port facility 14 and from the vehicle subsystems 18, the central facility 12 selects a vehicle from among the fleet to allocate to the user, as shown in step 28 in FIG. 2.

To select a vehicle, a vehicle search group is defined for the first port facility. The vehicle search group preferably includes vehicles 16 located and parked at the first port facility 14 that are not presently allocated to other users. The vehicle search group may also include vehicles 16 expected to arrive at the first port facility within a pre-defined time period. Vehicles scheduled to leave the port for transfer to another port or otherwise can be removed from the vehicle search group, as can vehicles that have insufficient SOC for the intended use. The pre-defined time period is preferably selected to minimize user-waiting time, yet maximize vehicle usage efficiency, or minimize energy usage or vehicle emissions. A pre-defined time period of, for example, about ten minutes may be sufficient to improve vehicle usage efficiency, without significantly inconveniencing users.

Vehicles 16 with an insufficient SOC to make the trip to the expected destination, including any additional distance and/or time entered by the user and an additional margin for error or unexpected travel may be excluded from the vehicle search group. Thus, a determination is made of the total charge necessary to safely make the trip, based on the expected destination, additional distance and/or additional time information entered by the user. The total necessary charge is compared with the SOC information received from vehicles present at the port facility or otherwise within the vehicle search group of the first port facility. Vehicles that have SOCs below the total necessary charge are excluded from the selection process. However, vehicles 16 which are in the process of being charged at the first port facility 14 may be included in the vehicle search group, provided that they will be sufficiently charged within a pre-defined time period (which may be the same pre-defined time period as noted above or a second time period) as may vehicles arriving at the port form completed trips, or from being transported to the port.

If a group of more than one vehicle 16 is in the vehicle search group of the first port facility and has sufficient SOC to make the requested trip, then, according to one embodiment of the present invention, the vehicle with the highest SOC within the group is selected and allocated to the user. It has been found that selecting the higher SOC vehicles first, typically improves the efficiency of the charging facilities by utilizing the charger in its more efficient linear range between 212 and 214 (see FIG. 11).

However, in the event that a user enters a request to make a long distance trip and, thus, requires a vehicle having a relatively high SOC, it would be advantageous to have a relatively high SOC vehicle available for the user, without requiring the user to wait a long period of time. Accordingly, in further preferred embodiments, the vehicle having the highest SOC within the above-defined group is reserved for the long-distance user and the second highest SOC vehicle is allocated to other users. Of course, if the group consists of only one vehicle, then that vehicle is allocated to the user, rather than reserving the vehicle for a further prospective long-distance user.

While the above alternative embodiment refers to reserving the highest SOC vehicle within the defined group for a prospective long-distance user, other embodiments may reserve the highest and second highest SOC vehicle and so forth. Moreover, different numbers of vehicles may be reserved for long-distance users depending upon the time of the day or the day of the week, statistical or simulated use patterns, vehicle reservations, or a variety of other factors. In preferred embodiments, statistics of users driving practices and habits at each port facility can be collected and analyzed to determine the optimal number of vehicles which should be reserved for long-distance users for any given port facility, day and time. In yet further preferred embodiments, the system and method switches between a routine of selecting the highest SOC vehicle within the group and a routine of reserving one or more of the highest SOC vehicles within the group for long-distance users, based on expected usage patterns or statistical analysis of actual or simulated usage patterns.

Figure 11:
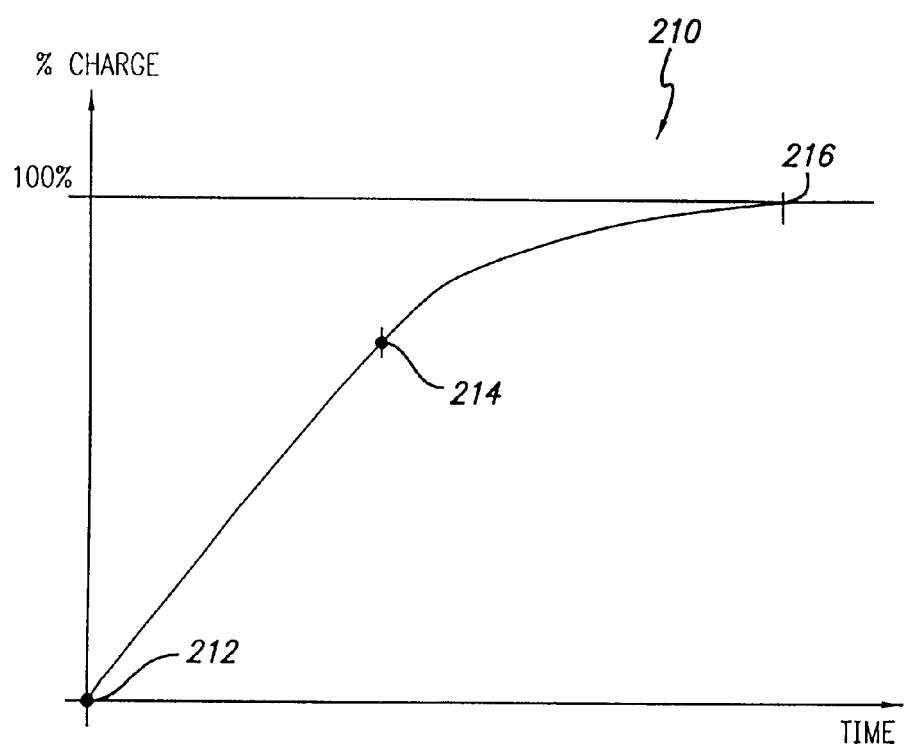
FIG. 11 is a graph of the state of charge of a vehicle battery versus charge time curve.

A port facility can contain a plurality of charging facilities 169 that are used to recharge the batteries of electrical vehicles. Typically battery/charging systems for electrical vehicles have a characteristic as shown in the SOC versus time graph 210 as shown in FIG. 11. Between points 212 and 214 on the graph, the charging of the battery is essentially linear. Between points 214 and 216, the charging of the battery approaches 100% charge exponentially and therefore the amount of charge obtained per unit time decreases. By allocating vehicles with a higher state of charge to users, instead of merely allocating vehicles with a sufficient charge for the users requested use, the vehicles within a central facility will tend to be used before the charge point 214 on the graph is reached. By charging vehicles in the linear region between 212 and 214, more effective use of the charging facilities is made than by charging vehicles in the range between 214 and 216. This method of allocating vehicles with the highest charge, however may be modified, as previously described, in order to provide vehicles for long trip use (i.e. vehicles charged between 214 and 216 on the state of charge graph). In cases where vehicles for long trips are needed the vehicles with the second highest charge could be allocated for use in order to preserve the most highly charged vehicle for the long trip user. In cases where a greater demand for long trip vehicles was present, the vehicle with the second highest charge might also be reserved. The allocation of vehicles can be modified by statistical or simulated vehicle use in order to make the most efficient use of charging facilities, while at the same time attempting to accommodate the need for vehicles with high state of charge for long trips.

Figure 2:
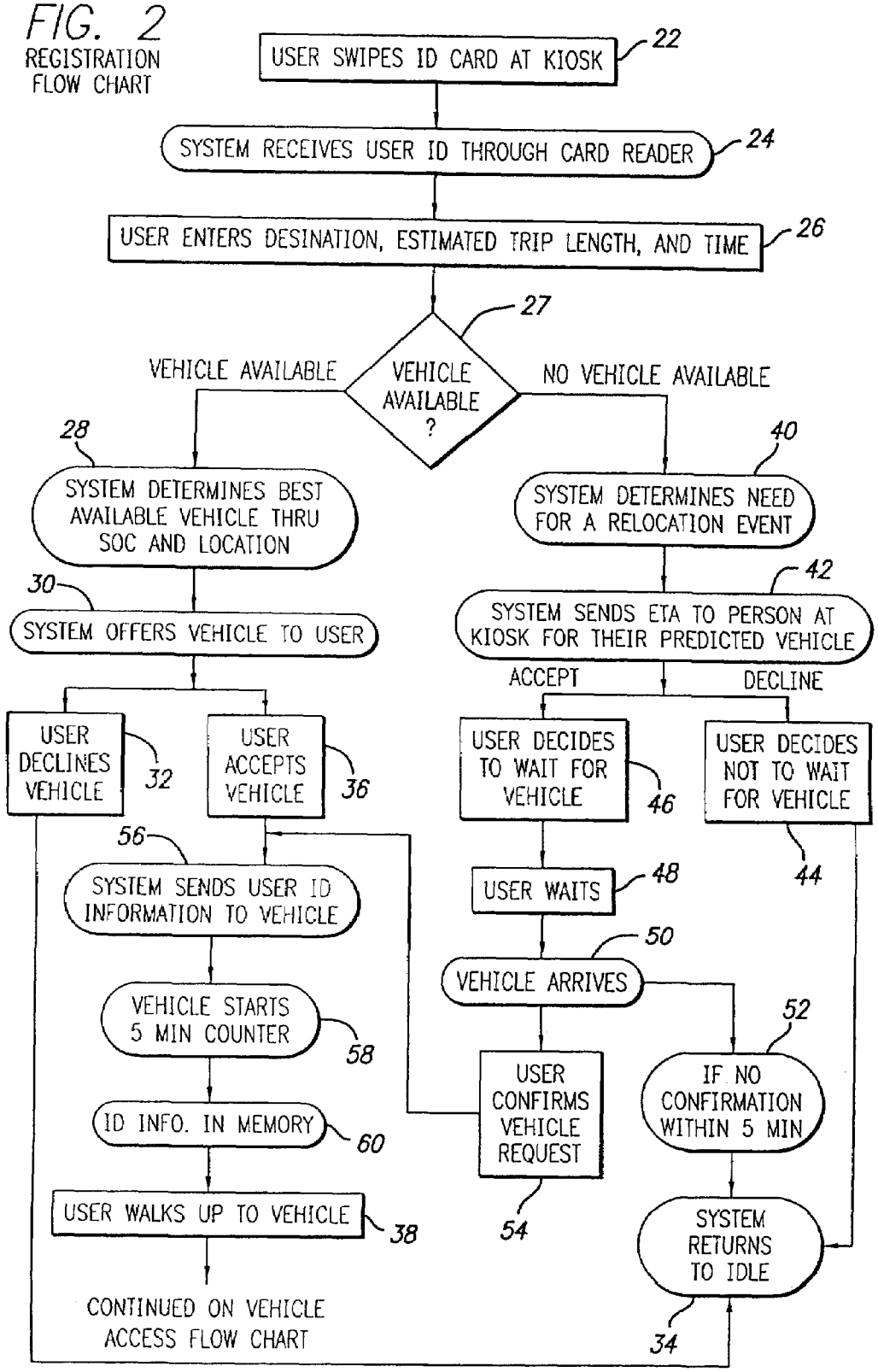
FIG. 2 is a flow chart representation of steps carried out to request, select and allocate a vehicle, according to embodiments of the present invention.

Once a vehicle is selected based on the above-noted routines, the vehicle is allocated to the user and the particular vehicle is identified to the user, as shown at step 30 in FIG. 2. The vehicle may be identified to the user by identifying the location of the vehicle, e.g. a parking space number, or by a number, e.g. license plate, displayed on the vehicle. If the selected vehicle is due to arrive at the port facility or is due to be sufficiently charged at the port facility within the above-noted pre-defined time periods, then the user is notified of the expected wait time and is asked if they will wait for the availability of the vehicle which will arrive at the port. In preferred embodiments, the user is provided with an option to accept or decline, for example, by a displayed a command prompt to accept or decline the proffered vehicle. If the user declines the vehicle, step 32, the system returns to an idle condition to await the next user, step 34. If the user accepts the vehicle, step 36, the user may then pick up the vehicle at the port facility 14, step 38.

Figure 12:
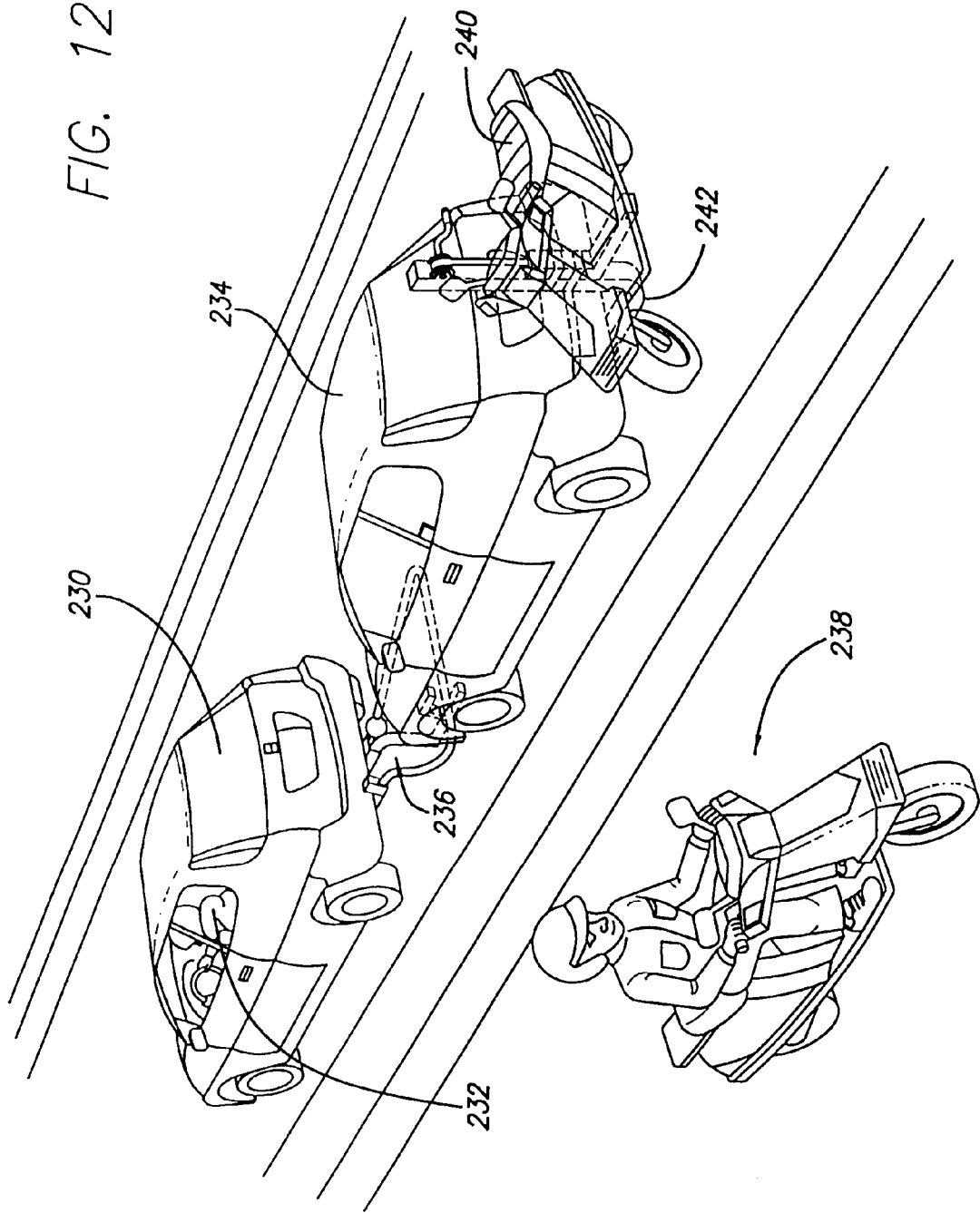
FIG. 12 is an illustration of a transfer of vehicles between ports.

Vehicles may arrive at the port in two distinct ways. A vehicle may arrive at the port if the user completes a trip and returns the vehicle to the port. A vehicle may also be relocated from another location. FIG. 12 is an illustration of a transfer of vehicles between ports. An attendant drives a first vehicle 230. A second vehicle 234 is towed behind the first vehicle 230, attached to the first vehicle via a towing mechanism 236. Couplings for the attachment of the towing mechanism may be installed on the front and rear of shared vehicles (e.g. 230, 234) so that any number of like vehicles may be connected in series for the purpose of relocating them from one port to another. The couplings installed on the vehicles may also be used to transport other vehicles. FIG. 12 illustrates a motor scooter 240 being transported on the second vehicle 234. The Scooter 240 is mounted on a lifting mechanism 242 Other vehicles, for example a bicycle, or motorized bicycle may also be transported in a similar manner. If a port attendant tows a second vehicle with a motor scooter, as shown in FIG. 12 then when the attendant has reached the destination port the attendant may uncouple the motor scooter and ride it back 238 to the embarkation port, thus relocating two vehicles in one trip. The motor scooter may also have a carrying bracket for transporting towing mechanisms back to the origination port along with the attendant. Electronic towing mechanisms have also been demonstrated. Such mechanisms cause vehicles behind a lead vehicle to follow the lead vehicle through electronic means. Such electronic towing mechanisms however are still in the experimental stage, and no commercial systems are available.

If no vehicles are within the vehicle search group and have sufficient SOC to meet the user's needs, then the system determines that a vehicle may need to be relocated from another port facility to the first port for the user, as shown in step 40. In such an event, information is displayed to the user relating to the expected time of arrival of a relocated vehicle or user returned vehicle, step 42, and is provided with an opportunity to accept or decline to wait for the vehicle. If the user declines, step 44, then the system returns to an idle condition, step 34, and awaits the next user. If the user accepts the wait time, step 46, then the user waits, step 48 until the vehicle arrives, step 50. Upon arrival of the vehicle, the user is prompted to confirm the request for the vehicle. If the user does not confirm the request within a preset time period, for example, five minutes as shown in step 52, then the system returns to an idle condition, step 34. If, however, the user timely confirms the request, step 54, then the user may pick up the vehicle, step 38.

Vehicles may be relocated from one port facility to another in a variety of manners. For example, an attendant may simply drive the vehicle from one facility to the other. However, the attendant performing the relocation would then be displaced from his original location. Accordingly, two attendants may drive two vehicles to from one port to the next, leave one vehicle at the destination port and then both attendants may return to their original port in the other one of the two vehicles. However, that process requires two attendants to transport a vehicle between facilities. Accordingly, in a preferred embodiment, some or all of the vehicles within the fleet are provided with towing bar connectors and each port facility is provided with towing bars for connecting two vehicles together. In this manner, one vehicle may be readily connected to another and towed to a remote port facility by a single attendant. The attendant may then disconnect the connected vehicles, leave one of the vehicles for the user and return to the original port facility with the other one of the two vehicles. Alternatively a secondary vehicle, for example a motor scooter, may be secured to the second vehicle. The motor scooter can, upon delivery of the vehicles, be used to transport both the attendant and the towing bar equipment thus allowing the two connected vehicles to remain at the destination port while the attendant and the towing equipment depart.

Controlling Access to Allocated Vehicles:

According to another aspect of the present invention, systems and methods for sharing vehicles involves controlling access to each allocated vehicle, so that access is allowed only for the user to whom the vehicle had been allocated. Security measures are implemented with the use of card keys (or other suitable machine-readable tokens) and personal identification numbers (PINs) issued to each user. Thus, according to this aspect of the invention, a user registers at a port facility, such as by swiping a card key (or other token) or by entering identification information through other suitable user interface means, such as described above with respect to step 22 of FIG. 2, and a vehicle is selected by the central facility. If the vehicle fleet includes electric powered vehicles, then the selection of the vehicle is preferably performed in accordance with the above described vehicle selection and allocation aspect of the invention. However, other embodiments may employ other suitable selection routines.

Once a vehicle is selected, identified and accepted by the user, such as described above with respect to steps 28, 30 and 36, then the user's identification information is sent to the vehicle subsystem 18 in the selected vehicle from the central facility 12, as shown in step 56. In preferred embodiments, the information is encrypted for security and addressed to the vehicle subsystem of the selected vehicle. Upon receipt of the user identification information, the vehicle subsystem starts a counter for timing a preset time period, such as five minutes, as shown in step 58, and stores the identification information in memory, as shown in step 60.

Figure 3:
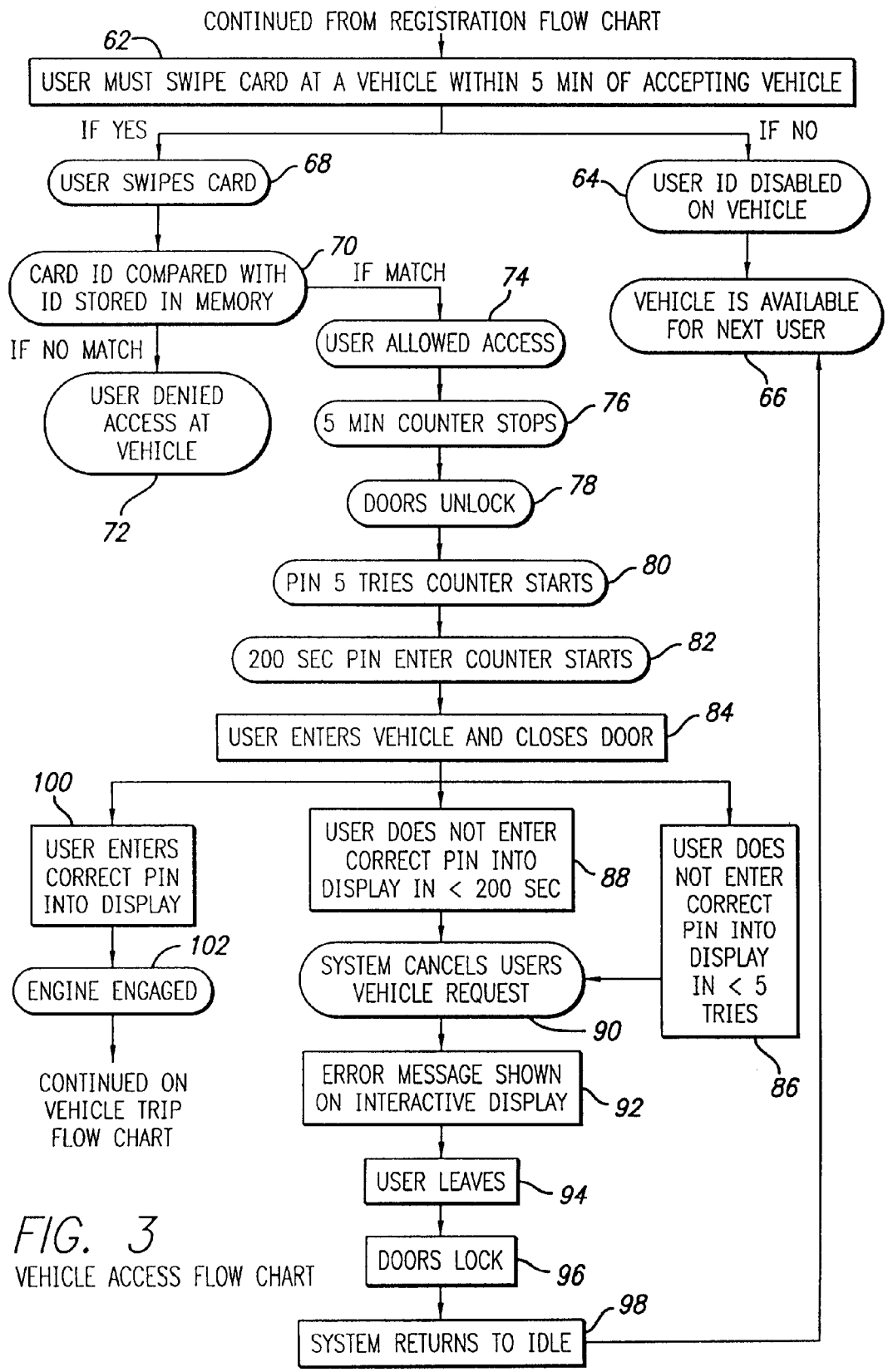
FIG. 3 is a flow chart representation of steps carried out for secure access and for enabling vehicles in a fleet of shared vehicles according to embodiments of the present invention.

Meanwhile, the user walks to the vehicle, such as in step 38. With reference to the flow chart of FIG. 3, if the user arrives at the vehicle within the preset time period, such as five minutes, the user then enters identification information, for example, by swiping a card key (or other machine-readable token) past a reader mounted on the selected vehicle, step 62 in FIG. 3. In preferred embodiments, the card key (or token) is the same card key (or token) used during the user registration at the port facility. If the identification information (card key or token) is not read by the reader within the preset time period, then the user identification routine is disabled on the vehicle subsystem, step 64 and the vehicle is designated as being available for further users, step 66.

If, on the other hand, the user's identification information (card key or token) is read within the preset time period, step 68, then the vehicle subsystem compares the stored identification information received from the central facility with the identification information entered by the user (read by the card or token reader), as shown in step 70. If the identification information does not match, then the user is denied access to the vehicle, step 72.

If the identification information received from the central facility matches the identification information (card key or token) entered by the user, then the user is allowed access to the vehicle, as shown in step 74 and a counter starts timing a preset time period, such as five minutes, as shown in step 76. In preferred embodiments, the vehicle subsystem employs an electronic door lock that is controlled to selectively unlock the vehicle, step 78, to allow access to the vehicle interior. In addition, counters within the vehicle subsystem are set and started for counting the number attempts of entering a personal identification number PIN, step 80, and for timing a preset time period by which a correct PIN must be entered, such as 200 seconds, step 82.

After gaining access to the vehicle, the user enters the vehicle and closes the vehicle door, step 84. The user is provided with an opportunity to enter a PIN in a user interface and display device mounted, for example, in the center console, dashboard or overhead console of the vehicle. If the user does not enter the correct PIN within a preset number of attempts, for example, five attempts, as shown in step 86, or within a preset time period, such as 200 seconds as shown in step 88, then the user's request for a vehicle is canceled, step 90 and an error message is displayed on the user interface and display device, step 92. Thereafter, when the user leaves the vehicle, step 94, and closes the doors, the doors are automatically locked, step 96, and the vehicle subsystem returns to an idle state, step 98. The vehicle is then made available for further users, as shown by the connection to step 66. If, on the other hand, the user enters the correct PIN within the preset number of attempts and the preset time period, step 100, then the vehicle subsystem enables the vehicle and the user may operate the vehicle, step 102.

Figure 13:
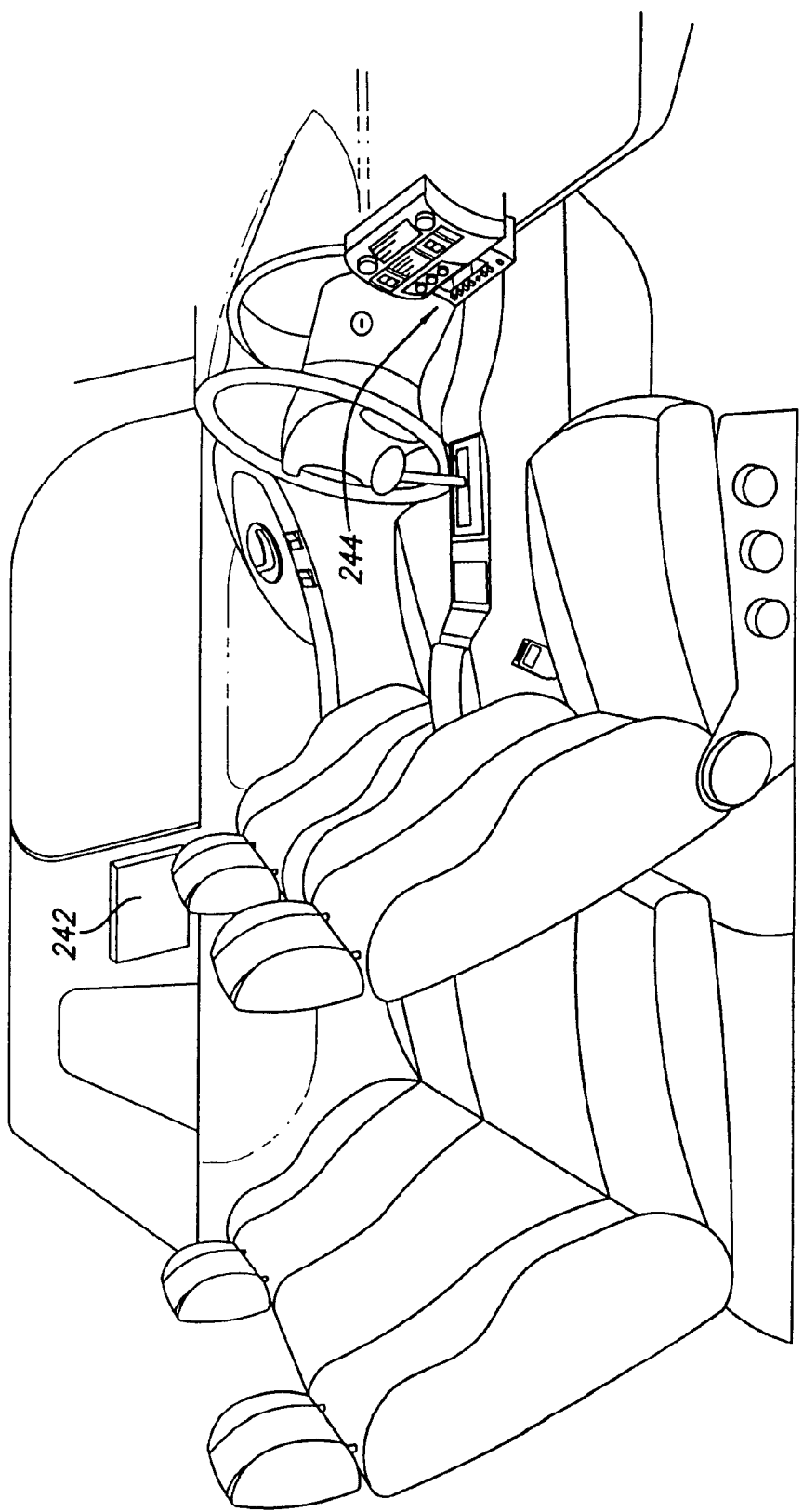
FIG. 13 is an illustration of a preferred embodiment's mounting of a identification card reader and a PIN entry console.

In one preferred embodiment both the user's identification data and PIN are read from a user's identification card and communicated to the vehicle to be allocated to the particular user. As soon as the user's identification data and PIN are communicated to the vehicle to be allocated to the particular user, an authorized user may drive the vehicle on a trip without any further communication between the vehicle and the central facility. Upon use of the proper identification card and entry of a correct pin within the vehicle, the vehicle is ready to drive. The identification card reader 242 may be located on a window as shown FIG. 13. The PIN entry is accomplished by means of an input and display device, which may be mounted in a center console within the vehicle as shown in FIG. 13. In another preferred embodiment, the determination of whether the entered PIN is correct or not is made at the central facility, for additional security. In this case the valid pin is not sent to the vehicle, instead the user in the vehicle enters a PIN which is then sent to the central facility for validity determination. If the PIN is valid then the central facility sends a notification of valid PIN to the vehicle. In particular, the central facility 12 preferably includes or operates with a database, table, algorithm, number encoded on the user's identification card, or the like which associates each user's identification information (card key or token) with the user's personal identification number PIN. Accordingly, upon receiving the requesting user's identification information, the central facility 12 obtains that user's PIN, for example, by comparing the identification information with corresponding data base entries and reading PIN information associated in a database with the identification information. Furthermore, when the user enters a PIN in the user interface and display device in the vehicle, steps 86 or 100, the vehicle subsystem transmits the entered PIN to the central facility. The central facility then compares the PIN received from the vehicle subsystem with the PIN retrieved from the database, table, algorithm, user's identification card, or the like. If a sufficient match exists, then the user is considered to have entered a correct PIN. The central facility may then send an enabling command to the vehicle, acknowledging that a correct PIN has been entered at the vehicle and the vehicle may be driven. The correct pin can be maintained in the vehicle subsystem 18 for later identification of the user and enabling of the vehicle, even if the vehicle were not in communication with the central facility.

Accordingly, preferred embodiments provide multiple levels of security. A first level of security is provided by the fact that a valid ID card is required even to enter the port facility. A second level of security is provided by the requirement that a user must proffer the proper identification at the kiosk 14 to be assigned a vehicle. A third level of security is provided at the vehicle where the user must enter valid identification information (for example, by swiping a card key or token) to gain access to the vehicle. A fourth level of security is provided by the requirement that, once the user gains access, the user must input a PIN that corresponds to the same user associated with the identification information. Moreover, each of these entries must be made within a preset period of time. These multiple levels of security reduce the risk of unauthorized entry and unauthorized use or theft of the vehicles. Thus, users are provided with a more secure environment within the vehicles and the vehicle owners and system administrators are provided with a reduced risk of vehicle theft or misuse.

Figure 4:
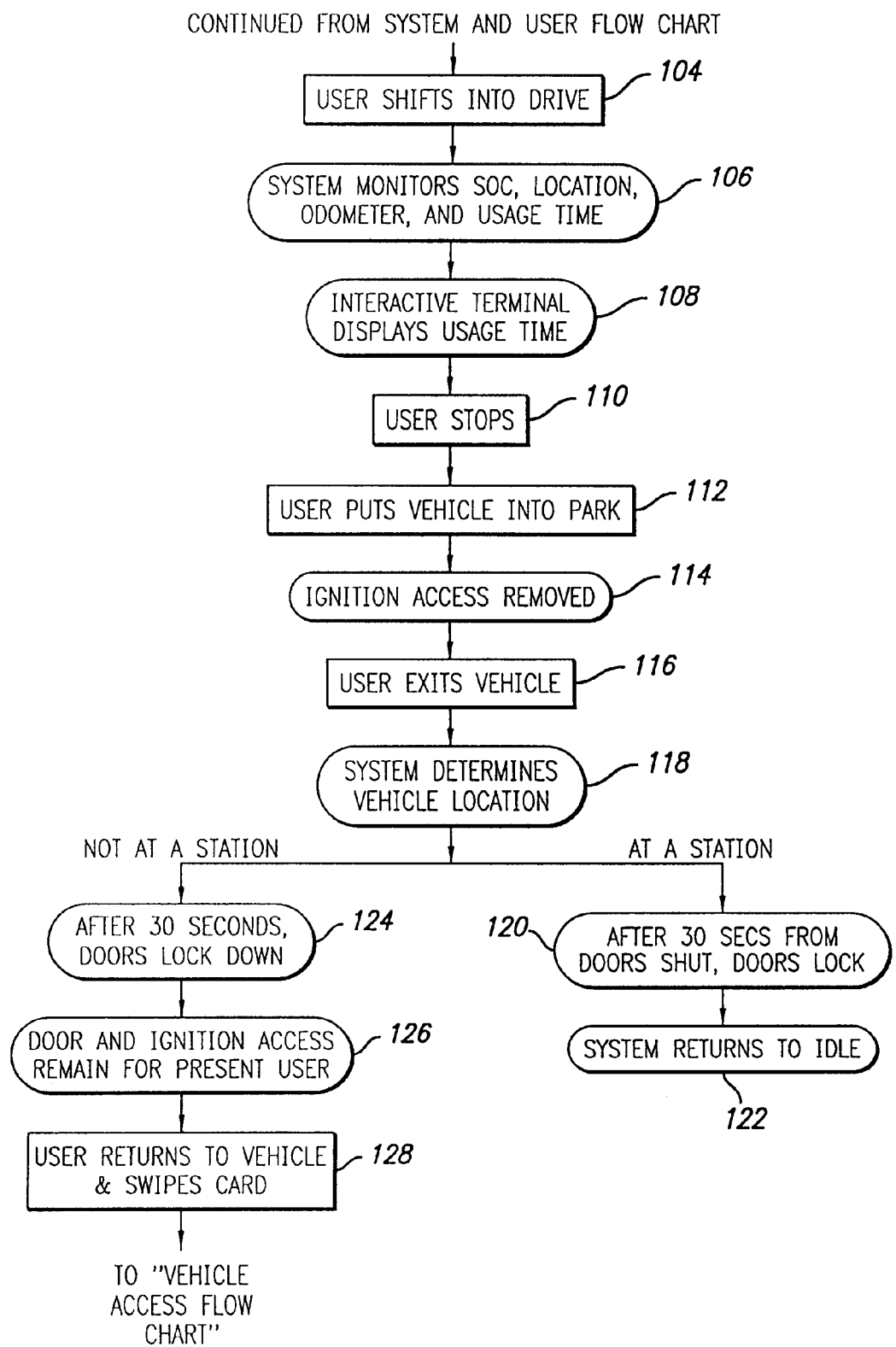
FIG. 4 is a flow chart representation of steps carried out for vehicle trips according to embodiments of the present invention.

Vehicle Trip and Condition Monitoring:

In accordance with further aspects of the present invention, after the user engages the engine as discussed above with respect to step 102, the user may shift into drive, step 104 of FIG. 4, to begin the user's requested trip. During the course of the trip, the vehicle subsystem monitors various parameters associated with the vehicle, for example, the location of the vehicle, the state of charge SOC of the vehicle (in electrical vehicles) and other operational parameters such as odometer reading, speed, and actual usage or drive time, as shown in step 106. Information, including location information, SOC and other operational information, such as whether the vehicle is moving and if so at what speed, whether the vehicle is charging, the odometer reading, the state of charge of the battery system, is preferably transmitted from the vehicle subsystem 18 to the central facility 12 at periodic or non-periodic intervals. In this manner, the central facility may readily track each vehicle in the fleet and render selection and allocation determinations based on vehicle location and SOC information for each vehicle, as described above. In addition, the central facility may monitor the SOC of fleet vehicles for purposes of warning users and port facility attendants to re-charge a vehicle.

The user interface and display device within the selected vehicle displays various information to the user, for example, usage time, or warnings relating to the SOC or other vehicle parameters, notices or travel information sent from the central facility, as shown in step 108. For example, the central facility may send a warning to a vehicle, to inform the user that the SOC of the vehicle is low or has experienced an unusual fluctuation. The user may be informed to return the vehicle to the nearest port or kiosk or to simply connect the vehicle to a charger, upon the user's scheduled return.

The user interface and display device within the selected vehicle may also be used to transmit messages to the central facility. A group of preset messages such as "flat tire", "vehicle inoperative" or "send help" may be transmitted from a user interface and display console within the vehicle by the user selecting which message to transmit to the central facility.

In further preferred embodiments, the vehicle subsystem may include or operate with a locator such as global positioning system (GPS), dead reckoning system, radio beacon triangulation system, or a variety of other techniques for providing tracking and route information. The user interface and display device may be used to display map and route information, in accordance with well known tracking and routing systems.

Vehicle Parking and Return:

At some point in the duration of the user's trip, the user will stop the vehicle and place the vehicle in a parking gear as shown in steps 110 and 112. In preferred embodiments, the vehicle subsystem 18 includes a sensor system for sensing such an event. Upon sensing that the transmission is set in a parking state and/or the ignition or power is turned off, the vehicle subsystem 18 transmits a parking state signal to the central facility. Once the vehicle is placed in a parking state, the vehicle is turned off and disabled, as shown in step 114, until the user re-enters the correct user identification and correct PIN. If the vehicle is at a port facility however and the vehicle is placed in a parking state, the vehicles is turned off and disabled, the user must go through the vehicle allocation process again if they desire to use a vehicle further. At the port the vehicle is returned to the pool of available vehicles when it is placed in the park state.

In further preferred embodiments, the vehicle subsystem 18 includes or operates with sensors for sensing the user exiting the vehicle, step 116, such as sensors for sensing the driver-side door opening and/or closing after the vehicle is set in a parking gear. Further embodiments may employ other suitable sensors for sensing a parking condition, including, but not limited to a pressure sensor for sensing presence of weight on the driver's seat, a sensor for sensing the setting of the parking brake, or the lack of motion for a predefined period of time, or combinations thereof. In yet further embodiments, the user may simply enter a notice indicating that the vehicle is parked in the user interface and display device in the vehicle.

Information relating to the parked state of the vehicle is transmitted from the vehicle subsystem to the central facility. However, further information is needed to determine whether the vehicle is parked and being returned to a port facility or is merely temporarily parking while the user is conducting an errand. Accordingly, in preferred embodiments, if the vehicle is in a parked state, then the vehicle's location is determined, as shown in step 118. As discussed above, any suitable vehicle tracking system may be employed to track and determine vehicle locations, including, but not limited to, GPS systems, a Teletrac system (Teletrac is a trademark of Teletrac, Carlsbad Calif.), or the like.

If the vehicle is determined to be within a port facility when placed in a parked condition, then the vehicle subsystem is controlled to lock the vehicle doors within a preset time period, for example, 30 seconds, after the last vehicle door is closed, step 120. The vehicle subsystem then returns to the idle condition, step 122, and awaits allocation to a further user.

If the vehicle is determined to be outside of a port facility when placed in a parked condition, then the vehicle subsystem is controlled to lock the vehicle doors and disable the vehicle within a preset time period, for example, 30 seconds, step 124. The vehicle subsystem also may be controlled to lock the vehicle doors after a door has been opened or after the ignition has been turned off. However, instead of returning to idle condition, the vehicle subsystem remains programmed to allow access and the enabling of the vehicle to the user with the same user identification and PIN, as shown in step 126. In this regard, when the user returns to the vehicle, the user may input the same identification data (for example, by swiping the same card or token) thereby entering the same PIN that was previously entered by the user or sent to the vehicle via the central system, as shown in step 128. Thereafter, the process of comparing identification information and processing PIN information is carried out similar to that described above with respect to FIG. 3, beginning at step 70.

Thus, in accordance with a further aspect of the present invention, the parking state of each vehicle 16 is sensed and a determination is made as to whether the vehicle has been returned or is merely temporarily parked during a user's trip. The identification information and PIN data required to access the vehicle remain the same, unless it is determined that the vehicle has been returned and parked at a port facility. Accordingly, a vehicle may be automatically reallocated to another user upon the determination that the vehicle has been parked and returned to that facility.

Safety and User Errors:

According to further aspects of the present invention, safety measures are implemented to address situations in which a legitimate user inadvertently enters the wrong PIN more than the allowed number of attempts, fails to enter the information within the preset time period, loses a card key or locks the card key inside of the vehicle. In the event that a legitimate user is inadvertently denied access to or enablement of a vehicle, then the user may contact the central facility by suitable means, including, but not limited to, telephone, portable Internet connection, or other communication device. Upon verification of the user's identity, the central facility transmits a command to the user's vehicle to instruct the vehicle subsystem to unlock and enable the vehicle for the user. If the user is at a remote location from the vehicle, for instance at a public telephone, the enablement command may have a delayed enabling effect in order to allow the user to return to the vehicle before it is enabled.

User identity may be verified, for example, by requesting that the user provide certain personalized information for comparison with such information obtained from the user when the user originally subscribed to the system. In addition, the location of the vehicle may be determined, as noted above, and may be compared with the expected vehicle location, based on the travel information entered by the user upon requesting the vehicle.

In addition the vehicle possesses a "fail safe" operations mode. Once a vehicle is checked out by a user it will continue to operate for the balance of the user's trip, even if the communications unit which maintains communication with the central facility should fail, or should the central facility cease function for any reason. Thus there is no condition where loss of communications between the central facility and the vehicle will cause the vehicle to become disabled.

The vehicle may also be disabled in some circumstances, such as when the vehicle is reported as stolen, or when proper authorities seek to immobilize the vehicle. The vehicle may also be enabled in an emergency, for instance if the vehicle is in danger of being damaged if it is not moved, such as a spreading fire in a nearby facility.

Vehicle Relocation:

As discussed above, in preferred embodiments, vehicles may be relocated from one port facility to another, to meet user demands or to relieve a facility of an oversupply of vehicles. Also as discussed above, in a preferred embodiment, some or all of the vehicles within the fleet are provided with towing bar connectors and each port facility is provided with towing bars for connecting two or more vehicles together. In this manner, one vehicle may be readily connected to another and towed to a remote port facility by a single attendant. The attendant may then disconnect the connected vehicles, leave one of the vehicles for the user and return to the original port facility with the other one of the two vehicles, or on a vehicle, for example a motor scooter, mounted on one of the vehicles.

The ability to connect vehicles, relocate the connected vehicles and disconnect the vehicles at the relocation in a time efficient manner requires a tow bar and connection system that can be operated quickly and easily. Accordingly in preferred embodiments some or all of the fleet vehicles are provided with tow bar connectors and each port facility is provided with at least one tow bar designed for quick and easy connection to the vehicles. The relocation aspect becomes more complex, however, when the fleet of vehicles includes a variety of different types of vehicles, such as four-wheel vehicles, two-wheel vehicles, and/or three-wheel vehicles. In such embodiments, it is preferred that a tow or carrier mechanism be provided to allow various types of vehicles to be towed or carried by other fleet vehicles from one port facility to another.

Figure 5:
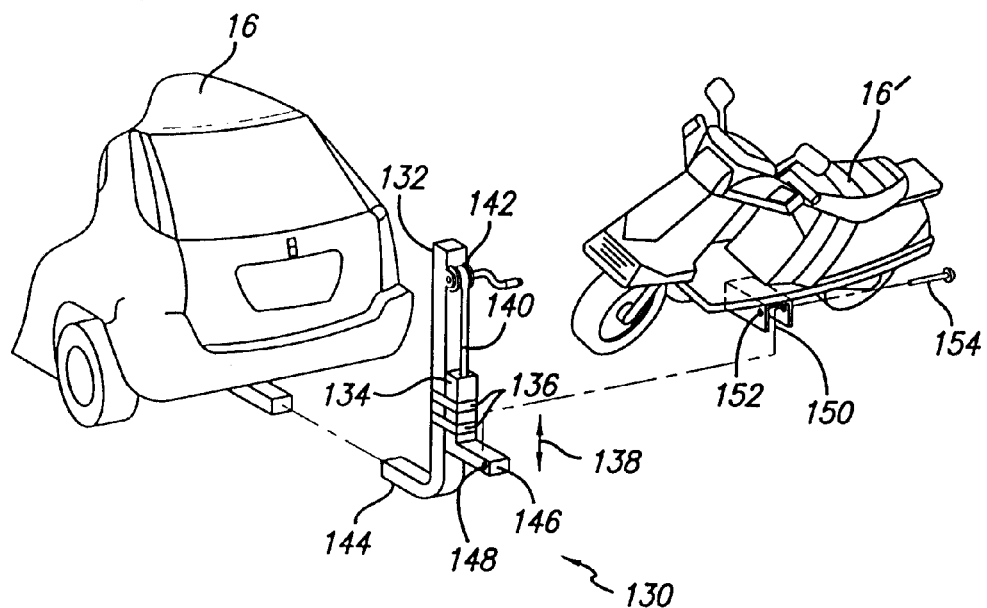
FIG. 5 is a schematic perspective view of a vehicle carrier according to an embodiment of the present invention.

Thus, for example, FIG. 5 shows an example of a carrier bracket 130 for connection to a standard tow bar receptacle on the rear of a vehicle, and which is configured to carry a further vehicle, such as a two-wheeled or three-wheeled vehicle. More particularly, the bracket 130 includes a first "L"-shaped member 132 and a second, smaller "L"-shaped member 134 coupled in a sliding relationship with the first member 132. Each "L" shaped member 132 and 134 includes a vertical leg and a horizontal leg. The vertical leg of the member 134 is coupled, by brackets 136 to the vertical leg of member 132 and is slidable in the direction of arrow 138, along the vertical dimension. The vertical leg of member 134 is connected to a flexible band 140. The opposite end of the strap 140 is wound around a spool or reel 142.

In operation, the horizontal leg 144 of member 132 is shaped to fit within and connect to the standard tow bar receptacle on the back of at least some of the fleet vehicles. The horizontal leg 146 of member 134 includes a key or pin receptacle aperture 148 and is configured to couple to an inverted "U"-shaped bracket mounted to the underside of the vehicle 16' to be carried. For example, FIG. 5 shows an inverted "U"-shaped bracket 150 mounted to the underside of a motorized two-wheeled vehicle. The bracket 150 defines a "U"-shaped opening for receiving the horizontal leg 146 of the member 134. Apertures 152 in the bracket 150 are positioned to align with aperture 148, upon the bracket 150 receiving the horizontal leg 146 of member 134. With the apertures aligned, the pin 154 may be inserted through the bracket 150 and leg 148, to secure the vehicle 16' to the carrier bracket 130. Accordingly the vehicle 16' may be carried by a vehicle 16, by simply connecting the leg 144 to the standard tow-bar receptacle of a vehicle 16, then placing the vehicle 16' on the horizontal leg 146 and inserting the pin 154 through the apertures 148 and 152. Finally, the vehicle 16' may then be lifted by rotating the spool or reel 142 to take up some of the flexible band 140 and, thereby, draw the bracket 134 in the vertically upward direction. The raising and lowering mechanism just described may be replaced by a variety of lifting mechanisms known in the art. For example the lifting mechanism provided may be a hydraulic, pneumatic, rack and pinion, scissors and screw, or other mechanisms known in the art.

After relocating the vehicles 16 and 16', the vehicle 16' may be detached from the bracket 130 by removing pin 54 and lifting the vehicle 16' off of the horizontal leg 146. If needed, the member 134 may be lowered by unwinding the spool or reel 142 to assist in removing the vehicle 16'. The lifting mechanism can enable someone to transport a vehicle that would otherwise be too heavy for an individual to lift onto a vehicle carrier without the lifting facility.

In preferred embodiments, many of the functions of the port facility computer system, the central facility and the vehicle subsystem described above with respect to the flow charts of FIGS. 2–4 can be implemented by programmable computers and processors. Embodiments of programmable computer or processor based facilities and vehicle subsystems are described below with reference to FIGS. 6–10 as representative examples. However, it will be understood that the system and methods according to the present invention may be implemented in various combinations of hardware and software configurations and are not limited to specific example configurations described herein.

Figure 6:
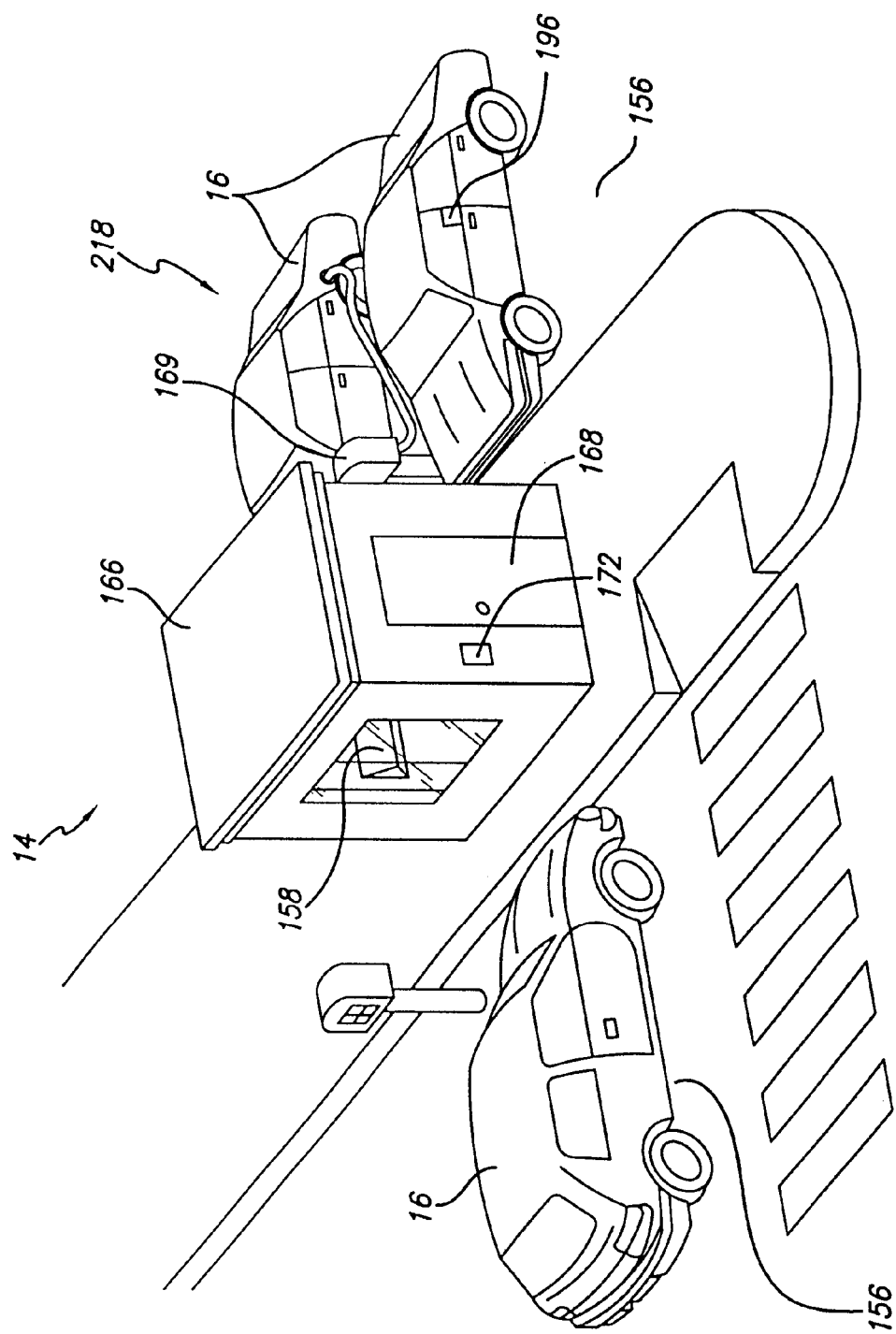
FIG. 6 is a schematic perspective view of a vehicle distribution port facility according to an embodiment of the present invention.
Figure 7:
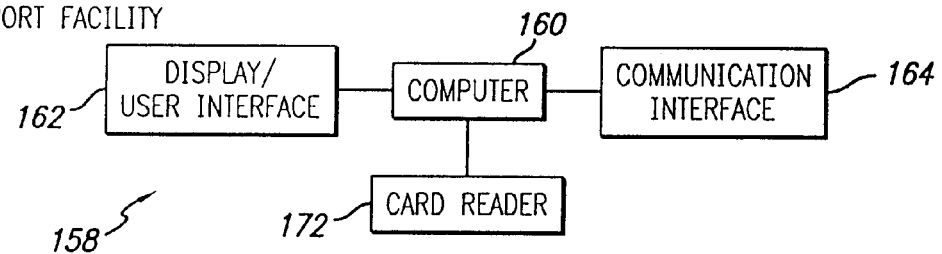
FIG. 7 is a generalized block diagram representation of a computer subsystem in a port facility according to an embodiment of the present invention.
Figure 8:
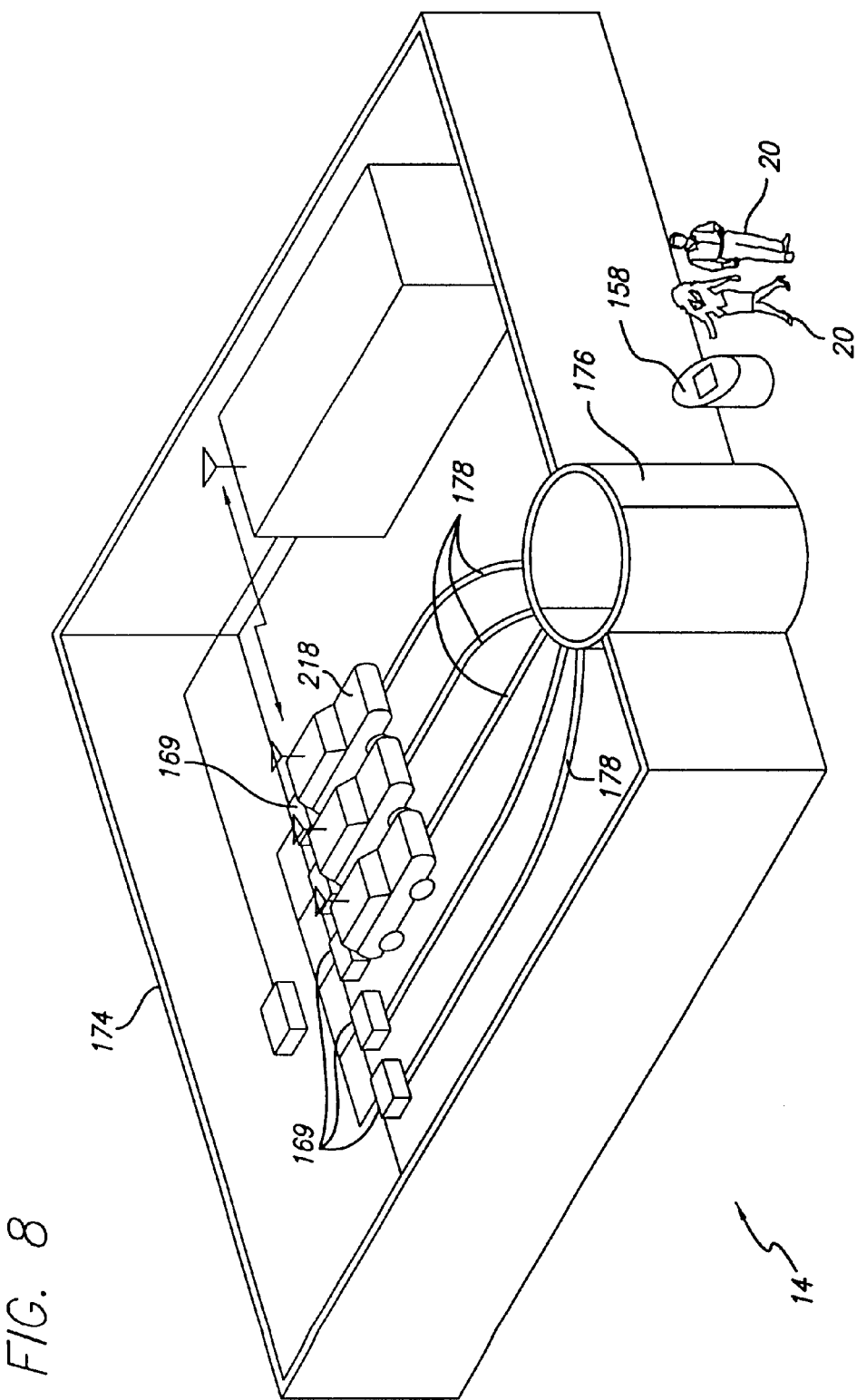
FIG. 8 is a schematic perspective view of a vehicle distribution port facility according to another embodiment of the present invention.
Figure 14:
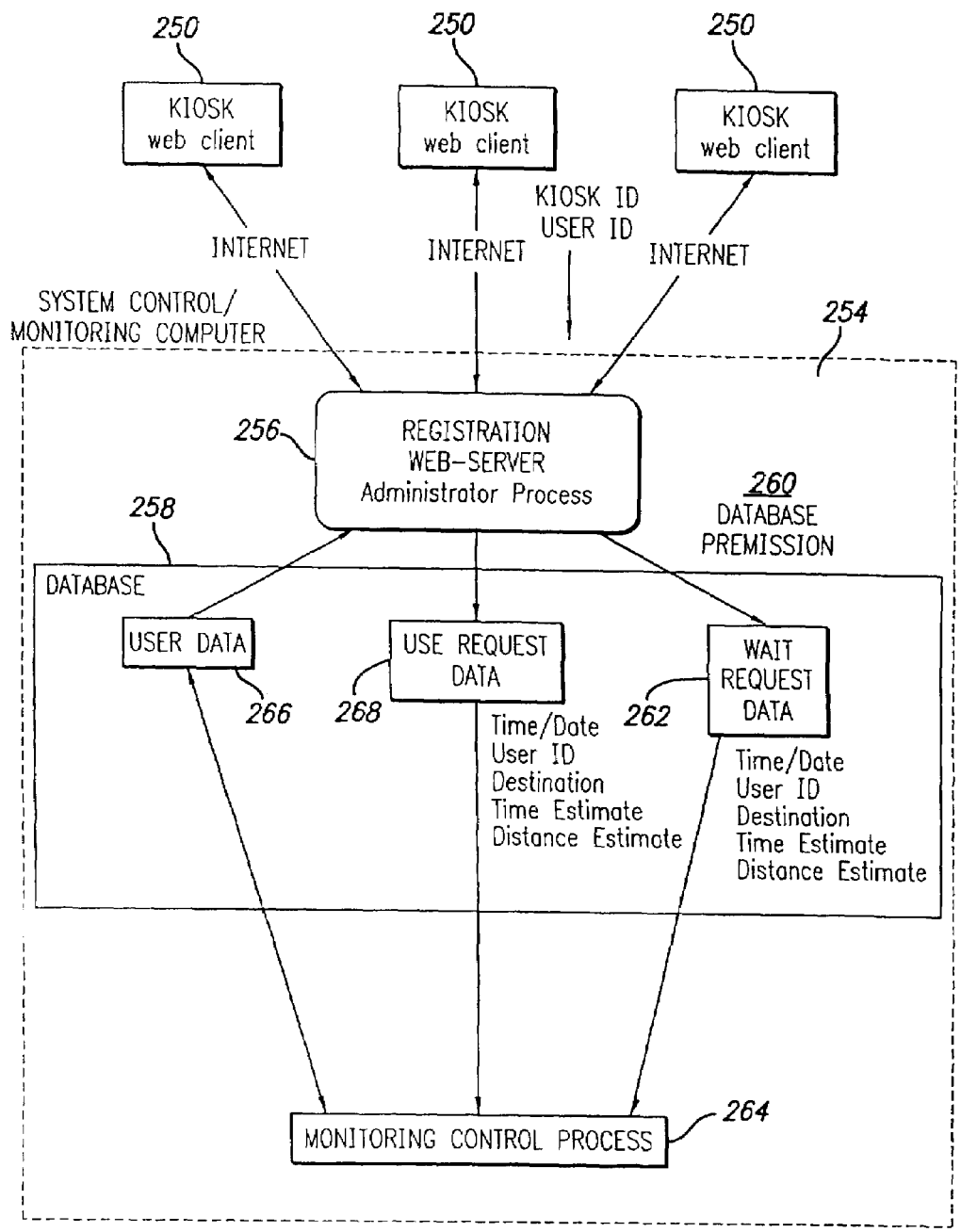
FIG. 14 is a block diagram illustrating a central office computer system and the subsystem kiosk computers linked to the central office computer system through the Internet.

Port Facility:

In preferred embodiments, the system 10 in FIG. 1 includes a plurality of port facility 14 located in geographically remote locations relative to each other, for example, at locations convenient for a large number of potential users, such as near train or bus stations, campuses, office parks, shopping areas or the like. Two examples of vehicle distribution port facility 14 are shown in FIGS. 6 and 8, respectively. In the example embodiments of FIGS. 6 and 8, the vehicle distribution port 10 facility includes parking spaces 156 for parking a plurality of vehicles 16. In addition, the distribution port 10 includes a computer subsystem 158 typically located at a kiosk 14 to facilitate user interaction. FIG. 7 shows a generalized block diagram representation of the computer subsystem 158, which includes a computer 160, a display and user interface device 162, and a communications interface 164 for communication with the central facility 12. The communications interface 164 may be, for example, a satellite, radio frequency RF or other wireless link, in which case, the interface 164 would include a transmitter/receiver. In a preferred embodiment of the invention, the interface 164 between the central office facility and the subsystem 158 may comprise a hard wired connection, such as through computers linked to the Internet. Such a preferred embodiment is illustrated in FIG. 14. In FIG. 14 the user's interface to the system is a kiosk containing a computer, display screen, and one or more input devices such as a card reader and a keyboard and touch screen. A kiosk computer 250 serves as a web client connected to the Internet. The system control computer 254 serves several functions, for example as the registration web-server 256 process computer, it also provides a monitoring and control process 264 for the system. The registration web-server 256 serves the kiosk 250 computer web clients. The registration web-server 256 also allows access to the registration web-server 256 by other computers connected to the Internet. Having a web connection not only simplifies the connection of the kiosk 250 computer(s) to the system by allowing the kiosk web clients 250 to be located anywhere there is a ready connection to the Internet, it allows access to the vehicle sharing system from other Internet connected computers. This is valuable for users of the system because they may access the system remotely, for example to make reservations for shared vehicles, to determine if vehicles are available at a port, to determine how long a wait there is for a vehicle, to apply for membership in the vehicle sharing system or for other reasons.

The registration web-server 256 also interfaces with a database 258. The database 258 contains user data 266, in which is kept a record of user information and statistics, such as the time and date that the user used the system, the user ID, the destination of the past trip, vehicle information, port information, as well as the time and distance estimates entered by the user for the past trips. These statistics can be used to predict vehicle usage, for example if a user makes a reservation for a shared vehicle. The database 258 may contain a user request database 268, in which user requests for vehicles and allocation information of the vehicle may be kept, as well as a wait request data 262. The wait request data 262 may contain information about vehicle requests that cannot be immediately filled, for lack of a vehicle or in the case that the vehicle is, for instance an electrical vehicle, lack of a vehicle with sufficient battery charge. The wait request data 262 may contain such information as the time and date that the user used the system, the user ID, the destination of the past trip requested as well as the time and distance estimates entered by the user for the trip requested. In one embodiment the wait request data may be on a separate computer and may be accessed by a user having the proper database permissions 260. Safeguarding the wait request database 262 is important because the monitoring and control process 264 within the system control computer 254 uses the wait request data 262 to allocate vehicles to users who are waiting for vehicles.

Figure 15:
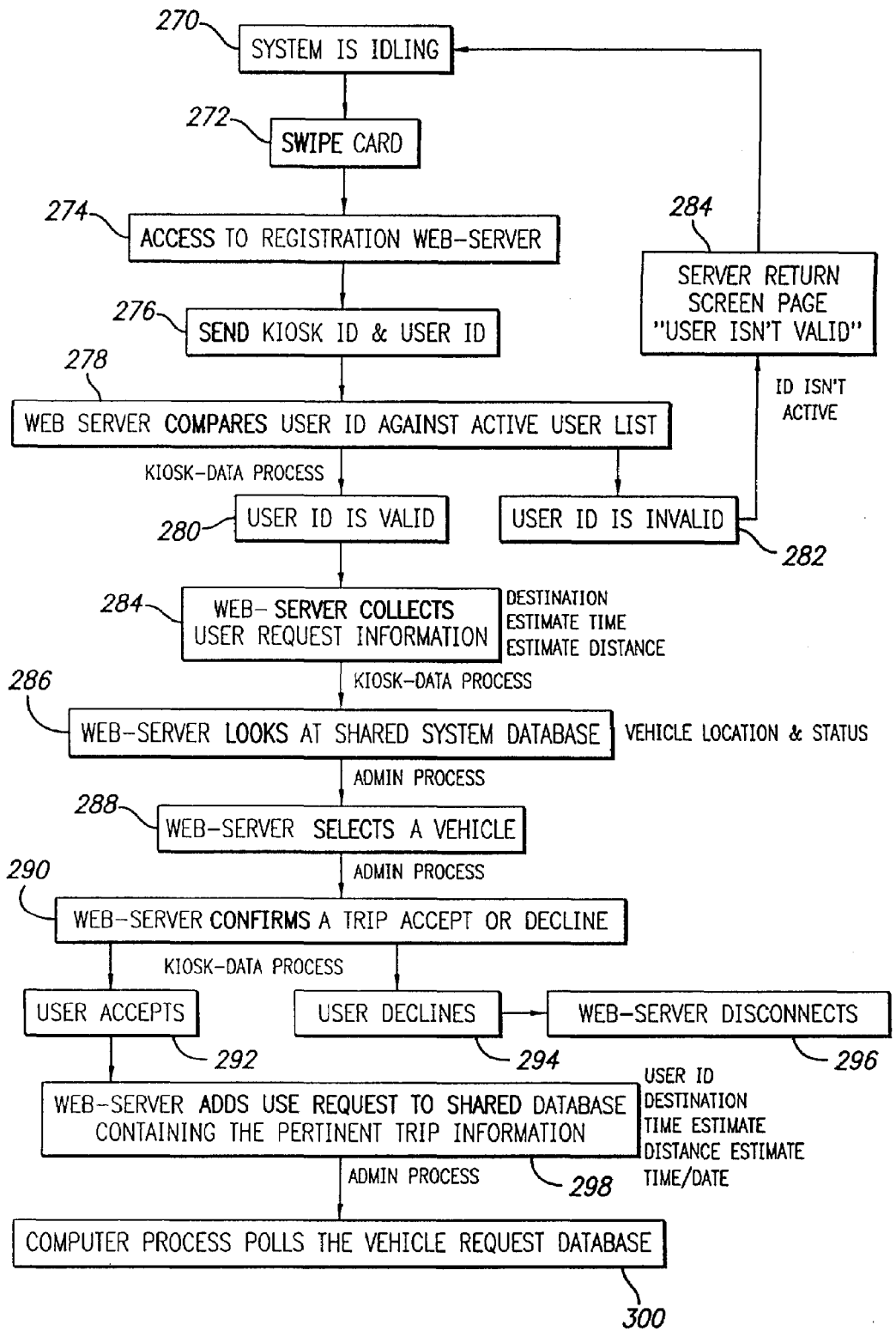
FIG. 15 is a flow diagram of the process when a user seeks a shared vehicle and interacts with a kiosk computer.

FIG. 15 is a flow diagram of the process when a user seeks a shared vehicle. As the user approaches the kiosk the system is idling, block 270. The user then swipes their identification card at the kiosk card reader as in block 272. The card read by the kiosk card reader is the same card as used at the vehicle to gain entry, and is also the same card used to gain access to the kiosk area. The kiosk computer then accesses the registration web server in block 274. When communication has been established between the registration web server 256 and the kiosk web client 250 computer, block 276 is executed. In block 276 user identification information, which has been obtained from the identification card, along with a kiosk ID identifying the transmitting kiosk, is sent to the registration web server. Next in block 278 the registration web server 256 compares the user ID received from the kiosk web client 250 computer to the active user list to see if the user is an authorized user. If the user ID is invalid, block 282, the user is told, in block 284, that their user ID is not valid and the system returns to the idle state in block 270. If the User ID is valid, block 280, then the registration web server 256 collects the user request information in block 284. The user request information consists of information such as vehicle destination, estimated time of the trip, and estimated distance of the trip.

When the user information has been collected the registration web server 256 queries the shared system database, in block 286, in order to satisfy the request. In block 288 the registration web server 250 selects an available vehicle from the database 258 to satisfy the user request. In block 290 the user is asked if they accept or decline the offered vehicle. If the user declines the vehicle, block 294, the registration web server 256 disconnects as seen in block 296. If the user accepts the vehicle, in block 292, the registration web server 256 stores the trip request data in the shared vehicle database in block 298. Finally in block 300 a computer control process polls the vehicle request database and processes the request.

The computer subsystem 158 is preferably disposed in a well lit and highly visible location and, more preferably, is also housed within a building or enclosed structure 166 (as shown in FIG. 2), to which access is controlled for user security. Access may be controlled by an attendant stationed at the port facility 14 or by a standard lock and key system, wherein a key to the door 168 is issued to each user. However, in preferred embodiments, the door lock is controlled by a card key entry system and each user is issued a card key comprising a card on which magnetic, optical or other machine-readable data is recorded. In such systems, the enclosed structure 166 is provided with an electronic door lock 170 (FIG. 7) and a card reader 172 disposed in a user accessible location outside of the structure 166, for example, adjacent the door 168.

To gain entry to the structure 166, a user must swipe or insert the user's card key past or in the card reader 172, to allow data from the card to be read and communicated to the computer 160. The computer 160 is programmed to process the user ID and, provided user ID is in the database of currently valid users, controls the electronic door lock 170 to unlock the door 168 and allow the user to enter the structure 166. For example, the data may comprise a user identification code or an expiration date code and the computer 160 may be programmed to compare user identification code with a database of valid user identification codes or compare the expiration date code with the current date. Thus, the computer 160 may be programmed to unlock the door 172, only if the user identification code is valid or an expiration date has not passed.

Once the user has entered the structure 166, the user will have access to the port facility display and user interface device 162. The display and user interface device 162 may comprise any suitable display including, but not limited to, a cathode ray tube CRT display, liquid crystal display LCD or the like, and any suitable user interface, including, but not limited to, a touch-screen integrated with the display, a keyboard, a mouse, a joy stick or the like. For user convenience, a CRT display with a touch-screen user interface is preferred.

The display and user interface 162 is provided to display instructions, prompts and information to the user and to allow the user to enter information, such as travel information and/or identification information, from the users ID card, for processing by the computer 160 or communication to the central facility 12. For added security, a second card reader (also represented by box 172 in FIG. 7) may be disposed within the structure 166, adjacent the display and user interface 162, for the user to enter card key data to initiate or continue interaction with the display and user interface 162. As described above, travel information and/or identification information entered by a user at a port facility 14 is communicated to the central facility 12 and is used by the central facility to select a vehicle for the user to pick up at the port facility 14.

In the FIG. 8 example, the vehicle parking spaces 156 are located within an enclosed structure, such as a building 174 having a gate or passage 176 through which vehicles may enter and exit, for added vehicle security. In addition, the FIG. 8 example includes tracks 178 for automated movement of vehicles between parking spaces 156 and the gate or passage 176. Thus, for example, a vehicle selected for a user 20 at the port facility may be automatically moved from a parking space 156 and delivered to the gate 176 for pick up by the user. Similarly, upon completion of a trip or upon delivery of a vehicle to the gate 176 of the port facility, the vehicle may be automatically moved from the gate to a parking space 156.

In preferred embodiments, the vehicle fleet includes or is composed entirely of electric powered vehicles. Accordingly, each of the vehicle distribution port facility examples shown in FIGS. 6 and 8 includes vehicle charging devices located adjacent at least some of the parking spaces. In the FIG. 8 example, the charging units may include automated connectors, for automatically connecting and disconnecting from vehicles in the parking spaces 156.

Figure 9:
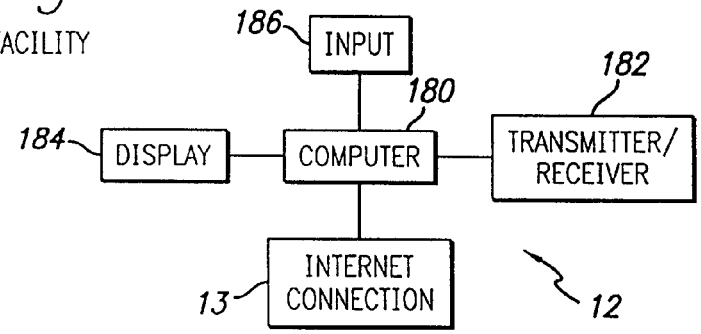
FIG. 9 is a generalized block diagram representation of a central facility according to an embodiment of the present invention.

Central Facility:

A generalized block diagram representation of an example central facility 12 is shown in FIG. 9. The central facility 12 in FIG. 9 includes a computer 180 with an Internet connection 13, programmed for processing user travel and/or identification information received from vehicle distribution port facility and selecting vehicles for users, based on the received information. The central facility 12 also includes a transmitter/receiver unit 182 for communication with the vehicle subsystems 18, for example using a satellite communication link, an RF link or other suitable wireless link. As described above, the central facility 12 is also coupled for communication with the computer subsystems 158 at the vehicle distribution port facility. That communication link may also be made through the transmitter/receiver unit 182 or, alternatively, through a separate communications link such as a hard wired link.

As discussed above, the computer 180 is preferably programmed to conduct vehicle tracking routines, for example, in accordance with standard vehicle tracking and communication software, including, but not limited to a Teletrac system (Teletrac is a trademark of Teletrac, Carlsbad Calif.). Accordingly, the central office facility 12 also includes display devices 184, for providing a system administrator with visual information regarding the location and also regarding various monitored operational conditions of vehicles in the fleet, and an input device 186, such as a keyboard, mouse, or the like, for allowing the system administrator to input instructions and data. Preferably, the central office facility is located in a secure environment, such as a secure office building, where data relating to user identification codes and other sensitive or private information may be maintained in a secure manner.

Figure 10:
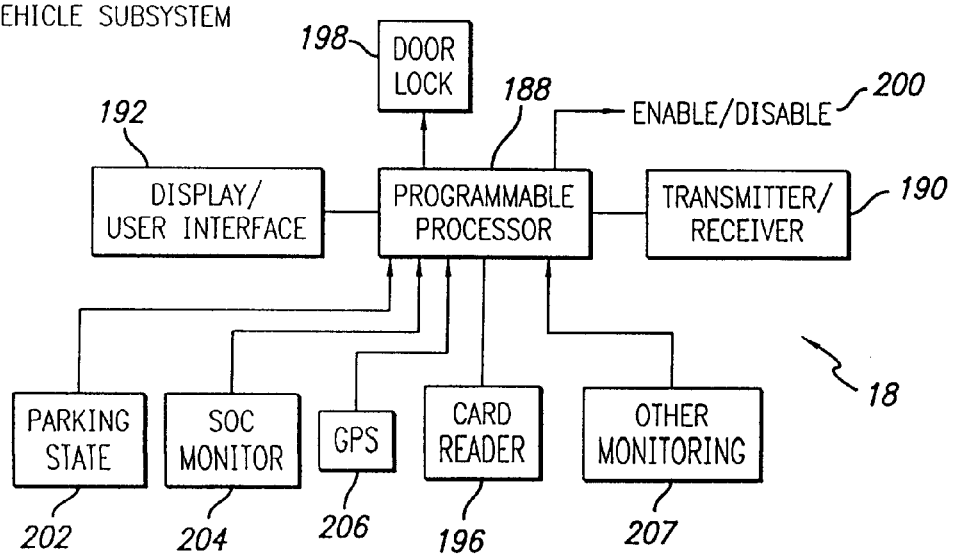
FIG. 10 is a generalized block diagram representation of a vehicle subsystem according to an embodiment of the present invention.

Vehicle Subsystem:

As described above, each vehicle 16 in the fleet is provided with a vehicle subsystem 18 for communicating with the central office facility 12 and for performing a variety of other functions, depending upon the embodiment of the invention. A generalized block diagram representation of a vehicle subsystem 18 is shown in FIG. 10. Each vehicle subsystem 18 includes a programmable processor or computer 188 for processing information and controlling the operation of other components of the subsystem 18. The vehicle subsystem 18 also includes a transmitter/receiver unit 190 for wireless communication with the central facility, as discussed above. The vehicle subsystem also includes a display and user interface unit 192.

In embodiments in which the vehicles within the fleet are enclosed vehicles, such as those shown in FIGS. 1, 6 and 8, then the display and user interface unit 192 is disposed within the enclosed interior of the vehicle, in a convenient location for access by a vehicle user, such as on the center console, dashboard or overhead console.

The vehicle subsystem for enclosed vehicles also includes a card reader 196 mounted for access by a user from outside of the vehicle. Thus, for example, FIG. 6 shows a card reader 196 mounted to the inside of the passenger window, behind the driver's side door. To gain access to the vehicle selected for a user, the user must swipe the card key past the card reader, to allow the data recorded on the card to be read. The data read by the card reader 196 is provided to the processor 188 for comparison with data received from the central facility, through transmitter/receiver unit 190. The processor 188 is programmed to control an electronic door lock 198 to unlock one or more vehicle doors and allow access to the vehicle interior, upon a sufficient match between the compared data.

Once the vehicle door is unlocked, the user may enter the vehicle and gain access to display and user interface 192. The processor 188 is programmed to operate with the display and user interface 192 to display instructions to the user and to receive data input by the user, including a personal identification number PIN. The processor 188 is further programmed to enable or disable the operation of the vehicle by providing an enable or disable signal 200 to an operation-critical element, based on the validity of the PIN entered by the user. The enable or disable signal may be used to control a suitable device for enabling or disabling any operation-critical element of the vehicle, including, but not limited to, the vehicle ignition system or fuel line (for internal combustion powered vehicles), the battery power source, or the like. Devices which respond to enable or disable signals for enabling or disabling ignition systems, fuel lines, battery power sources or the like are well known in the vehicle security field. In the case of an electric vehicle, for example, a disable signal would be activated by the vehicle being in a charging state. This would prevent the vehicle from being driven while it was connected to the charging facilities, thus eliminating damage that could be caused if the vehicle were accidentally driven while still connected to the charging facilities.

In further embodiments of the invention, the vehicle subsystem includes one or more parking state sensors 202, for sensing the parking state of the vehicle. As discussed above, the parking state of a vehicle may be sensed in various manners, including, but not limited to, sensing the setting of the transmission in the parking gear, the setting the parking brake, the lack of movement for a predetermined period of time, the opening and/or closing of a vehicle door or combinations of those events. In a preferred embodiment, a parking state is sensed by the combination of the vehicle being placed in a parking gear and the driver-side door being opened and vehicle speed being equal to zero. In such preferred embodiment, the parking state sensors 202 would, therefore, include a parking gear sensor for sensing the setting of the parking gear and a door sensor for sensing the opening and closing of the vehicle door. Other embodiments may contain various other methods for deciding that a user trip is over. For example the location of the vehicle at the port may be taken into account in order to determine that vehicle is in the parking state and the current trip has ended. There are several ways of determining that the vehicle is located at a port. The vehicle location system may place the vehicle at the port, the vehicle identity may be read at the entry gate to the port for instance by tripping a switch that may cause the vehicle identity to be read. The reading of a vehicle identity may also occur by sensors located at the vehicle parking spaces, or at the entrance to the parking lot. In addition placing a vehicle in park in a parking space and opening the door may signal the end of the trip, or a user may directly enter that the trip is over on the vehicle console. There is a great variety of flexibility in methods of deciding that a vehicle is in the parking state and the exact method chosen will depend on the implementation.

In yet further embodiments of the invention in which vehicles in the fleet include electric powered vehicles, the vehicle subsystem for each electric powered vehicle includes a state of charge SOC monitor 204 for monitoring the available charge remaining in the vehicle. Data representing the SOC is provided to the processor 188, for transmission to the central station 12 by the transmitter/receiver 190 for use vehicle allocation and monitoring functions described above. Data representing other parameters 207, such as vehicle speed, door open, vehicle charging, and so forth are also provided to the processor 188, for transmission to the central station 12 by the transmitter/receiver 190.

In yet further embodiments, the vehicle subsystem includes a vehicle location or tracking system. Such systems are known in the art. Vehicle location may be tracked through a variety of methods, the vehicle itself can employ triangulation using radio beacons or dead reckoning, the vehicle may also be tracked by receiving a signal from the vehicle and triangulating on that signal. In one further embodiment a GPS device 206 provides location information to the processor 188, for transmission to the central station 12 and/or for providing on-board tracking and route planning data. The choice of tracking system, however is a matter of implementation convenience.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while many of the data processing and decision making functions are described above as being performed by the central facility, other embodiments may include port facility computer substystems that are programmed to perform some of such functions. In yet further embodiments, the vehicle susbsystem may be programmed to perform some of such functions. Therefore, it is intended that the scope of the invention be limited not by this detailed description, but rather by the claims appended hereto.

What is claimed is:

1. A method for determining an order of allocating electric vehicles for use depending on different charge levels of the vehicles, the method comprising:

one or more computers receiving from a user an expected distance of a specific, planned trip;

the computers selecting a group of vehicles having charge levels which are adequate for covering said expected distance of the specific, planned tip;

the computers determining whether a vehicle having a second highest level of charge is in the selected group; and if a determination is made that a vehicle having a second highest level of charge is in the selected group, the computers allocating the vehicle having a second highest level of charge in the selected group.

2. A method for allocating one or more vehicles from a fleet of electric powered vehicles to one or more users, wherein each vehicle has a state of charge (SOC) at any given time, the method comprising:
one or more computers receiving a travel request from a user, wherein the travel request includes information concerning a specific, planned trip and the information is usable to determine the SOC necessary for that trip;
the computers selecting a group of one or more vehicles from the fleet, where each selected vehicle has a SOC sufficient to meet the travel request from the user;
the computers determining whether a vehicle having a second highest SOC is in the selected group; and
if it is determined that a vehicle having a second highest SOC is in the selected group, then the computers allocating the vehicle having the second highest SOC in the group for the user.

3. A method as recited in claim 2, wherein said step of receiving a travel request comprises receiving information associated with an expected distance of travel and wherein said step of selecting a group comprises selecting one or more vehicles, each with a sufficient SOC to travel the expected distance.

4. A method as recited in claim 2, wherein said step of receiving a travel request comprises receiving information associated with an expected time period of use and wherein said step of selecting a group comprises selecting one or more vehicles, each with a sufficient SOC to travel for the expected time period.

5. A method as recited in claim 2, wherein said step of receiving a travel request comprises receiving information associated with an expected destination port and an expected distance of travel beyond a direct route to the destination port and wherein said step of selecting a group comprises selecting one or more vehicles, each with a sufficient SOC to travel the combined distance of the direct route to the destination port and expected distance of travel beyond the direct route.

6. A method as recited in claim 2, further comprising the step of identifying the allocated vehicle to the user.

7. A method as recited in claim 6, wherein said step of identifying the allocated vehicle to the user comprises displaying identification information to the user on a display device.

8. A method as recited in claim 2, wherein said step of receiving a travel request comprises:
displaying a map to the user; and
receiving user-selected map locations corresponding to locations on the displayed map through a user-interface associated with the displayed map.

9. A method for allocating one or more vehicles from a fleet of electric powered vehicles to one or more users, wherein each vehicle has a state of charge (SOC) at any given time, the method comprising:
providing a user-interface terminal at one or more ports;
receiving travel request information from a user at a user-interface terminal and communicating the travel request information to a computer, wherein the travel request includes information concerning a specific, planned trip and the information is usable to determine the SOC necessary for that trip;
operating the computer to select a group of one or more vehicles from the fleet, where each selected vehicle has an SOC sufficient to meet the travel request information from the user;
the computer determining whether a vehicle having a second highest SOC is in the selected group; and
if it is determined that a vehicle having a second highest SOC is in the selected group, then operating the computer to allocate the vehicle having the second highest SOC in the group for the user.

10. A method as recited in claim 9, wherein said step of receiving travel request information comprises receiving information associated with an expected distance of travel and wherein said step of operating the computer to select a group comprises selecting one or more vehicles, each with a sufficient SOC to travel the expected distance.

11. A method as recited in claim 9, wherein said step of receiving travel request information comprises receiving information associated with an expected time period of use and wherein said step of controlling the computer to select a group comprises selecting one or more vehicles, each with a sufficient SOC to travel for the expected time period.

12. A method as recited in claim 9, wherein said step of receiving travel request information comprises receiving information associated with an expected destination port and an expected distance of travel beyond a direct route to the destination port and wherein said step of operating the computer to select a group comprises selecting one or more vehicles, each with a sufficient SOC to travel the combined distance of the direct route to the destination port and expected distance of travel beyond the direct route.

13. A method as recited in claim 9, further comprising the step of displaying vehicle identification information on a display device at the port facility from which travel information is received, identifying the vehicle allocated to the user.

14. A method as recited in claim 9, wherein:
said step of providing a user-interface terminal at one or more ports comprises providing a user-interface at a plurality of ports disposed at geographically remote locations relative to each other;
each port has a vehicle search group (VSG) in which more than one and less than all of the vehicles from the fleet may be located at any given time; and
said step of operating, the computer to select a group of one or more vehicles from the fleet comprises selecting a group from the VSG of the port from which travel information is received.

15. A method as recited in claim 14, wherein the VSG of any given port includes vehicles parked at a parking facility at the port.

16. A method as recited in claim 15, wherein the VSG of any given port further includes vehicles due to arrive at the port within a preset time period.

17. A method as recited in claim 16, wherein the VSG of any given port further includes vehicles due to become sufficiently charged at the port within a preset time period.

18. A method as recited in claim 15, wherein the VSG of any given port further includes vehicles due to become sufficiently charged at the port within a preset time period.

19. A vehicle allocation system for allocating one or more vehicles from a fleet of electric powered vehicles to one or more users, wherein each vehicle has a state of charge (SOC) at any given time, the vehicle allocation system comprising:
one or more ports at geographically remote locations relative to each other, each port having a user-interface terminal for receiving a travel request from a user, wherein the travel request includes information concerning a specific, planned trip and the information is usable to determine the SOC necessary for that trip;

a computer system coupled in communication with at least one user-interface terminal and programmed to respond to a travel request received from a user, for selecting a group of one or more vehicles from the fleet, where each selected vehicle has a SOC sufficient to meet the travel request from the user, said computer system being further programmed to determine whether a vehicle having a second highest SOC is in the selected group, and, if so, allocate the vehicle having the second highest SOC in the group for the user.

20. A system as recited in claim 19, wherein said computer system comprises a central station computer system coupled in communication with a plurality of user-interface terminals at a plurality of said ports.

21. A system as recited in claim 20, wherein:
each port has a vehicle search group (VSG) in which more than one and less than all of the vehicle from the fleet may be located at any given time; and
said computer is programmed to select a group of one or more vehicles by selecting a group from the VSG of the port from which travel information is received.

22. A system as recited in claim 21, wherein each port includes a vehicle parking facility at which one or more vehicles may be parked at any given time and the VSG of a given port includes vehicles parked at a parking facility at the port.

23. A system as recited in claim 22, wherein each port includes at least one vehicle charging facility and the VSG of a given port further includes vehicles due to become sufficiently charged at the port within a preset time period.

24. A system as recited in claim 22, wherein the VSG of a given port further includes vehicles due to arrive at the port within a preset time period.

25. A system as recited in claim 24, wherein each port includes at least one vehicle charging facility and the VSG of a given port further includes vehicles due to become sufficiently charged at the port within a preset time period.

26. A system as recited in claim 19, wherein said travel request comprises information associated with an expected distance of travel and wherein said group comprises one or more vehicles, each with a sufficient SOC to travel the expected distance.

27. A system as recited in claim 19, wherein said travel request comprises information associated with an expected time period of use and wherein said group comprises one or more vehicles, each with a sufficient SOC to travel for the expected time period.

28. A system as recited in claim 19, wherein said travel request comprises information associated with an expected destination port and an expected distance of travel beyond a direct route to the destination port and wherein said group comprises one or more vehicles, each with a sufficient SOC to travel the combined distance of the direct route to the destination port and expected distance of travel beyond the direct route.

29. A system as recited in claim 19, wherein each port is provided with a display device for displaying identification information, identifying an allocated vehicle to a user.

30. A system as recited in claim 19, wherein each of user-interface terminals comprises a display device far displaying a map to the user and an user/display interface for receiving user-selected map locations corresponding to locations on the displayed map from a user.

31. A system as recited in claim 19, further comprising a plurality of vehicle subsystems associated on a one-to-one basis with the vehicles from the fleet, each vehicle subsystem including means for detecting the SOC of its associated vehicle and for transmitting information corresponding to the detected SOC to the computer system.

32. A system as recited in claim 19, wherein the request includes user identification information and wherein said computer system is programmed to further base the vehicle selection on the user identification information.

33. A system as recited in claim 32, wherein said computer system includes a storage of vehicle preference information associated with each user identification and is programmed to retrieve from storage vehicle preference information associated with user identification information received from a port terminal and to further base the vehicle selection on the vehicle preference information.

34. A system as recited in claim 33, wherein the vehicle preference information comprises information from the group consisting of: number of vehicle wheels, number of vehicle doors, preferred minimal SOC or range of SOCs, distance usually traveled, and usual duration of vehicle use.

35. A method for allocating one or more vehicles from a fleet of electric powered vehicles to one or more users, wherein each vehicle has a state of charge (SOC) at any given time, the method comprising:
one or more computers receiving a travel request from a user, wherein the travel request includes information concerning a specific, planned trip and the information is usable to determine the SOC necessary for that trip;
the computers selecting a first group of one or more vehicles from the fleet, where each selected vehicle has a SOC sufficient to meet the travel request from the user;
the computers determining whether one or more vehicles belong to a second group of N vehicles having the N highest SOCs of the vehicles within the first group, wherein N is a predetermined positive integer greater than 1; and
if it is determined that one or more vehicles belong to the second group of N vehicles,
the computers selecting the second group of N vehicles having the N highest SOCs of the vehicles within the first group; and
the computers allocating to the user the vehicle having the highest SOC of vehicles in the second group but not the first group.

* * * * *